US 6,690,402 B1

(12) United States Patent
Waller et al.

(10) Patent No.: US 6,690,402 B1
(45) Date of Patent: Feb. 10, 2004

(54) METHOD OF INTERFACING WITH VIRTUAL OBJECTS ON A MAP INCLUDING ITEMS WITH MACHINE-READABLE TAGS

(75) Inventors: Michael Waller, London (GB); Robin Mackay, London (GB); Matthew Ward, London (GB)

(73) Assignee: NCR Corporation, Dayton, OH (US)

( * ) Notice: Subject to any disclaimer, the term of this patent is extended or adjusted under 35 U.S.C. 154(b) by 454 days.

(21) Appl. No.: 09/666,656

(22) Filed: Sep. 20, 2000

(30) Foreign Application Priority Data

Sep. 20, 1999 (GB) .............................................. 9922211
Mar. 14, 2000 (GB) .............................................. 0006161

(51) Int. Cl.⁷ ................................................ G09G 5/00
(52) U.S. Cl. ...................... 345/850; 345/848; 345/852; 345/745
(58) Field of Search ......................... 345/742, 744–747, 345/757, 848, 850, 851, 855, 864, 173; 340/995, 990

(56) References Cited

U.S. PATENT DOCUMENTS

| | | | |
|---|---|---|---|
| 5,159,180 A | | 10/1992 | Feiler |
| 5,736,975 A | | 4/1998 | Lunetta |
| 5,878,421 A | | 3/1999 | Ferrel et al. |
| 5,905,251 A | | 5/1999 | Knowles |
| 5,945,985 A | * | 8/1999 | Babin et al. ............. 715/500.1 |
| 6,014,137 A | * | 1/2000 | Burns ......................... 345/747 |
| 6,075,502 A | * | 6/2000 | McDowall et al. ............ 345/7 |
| 6,091,956 A | * | 7/2000 | Hollenberg ................. 455/456 |
| 6,119,944 A | * | 9/2000 | Mulla et al. ........... 235/472.03 |
| 6,195,093 B1 | * | 2/2001 | Nelson et al. .............. 345/732 |
| 6,204,764 B1 | | 3/2001 | Maloney |
| 6,388,688 B1 | * | 5/2002 | Schileru-Key ............... 345/854 |
| 6,414,672 B2 | * | 7/2002 | Rekimoto et al. ........... 345/173 |
| 6,545,660 B1 | * | 4/2003 | Shen et al. ................... 345/156 |
| 6,573,916 B1 | * | 6/2003 | Grossweiler et al. ....... 345/850 |

FOREIGN PATENT DOCUMENTS

| | | |
|---|---|---|
| DE | 19743386 | 2/1993 |
| EP | 0626635 | 11/1994 |
| EP | 0 837 406 A2 | 4/1998 |
| WO | WO 98/03923 | 1/1998 |
| WO | WO 98/38761 | 9/1998 |
| WO | WO 98/38762 | 9/1998 |
| WO | WO 98/49813 | 11/1998 |
| WO | WO 98/51036 | 11/1998 |
| WO | 98/06055 | * 12/1998 |
| WO | WO 00/45302 | 8/2000 |
| WO | 0060440 | 10/2000 |

* cited by examiner

*Primary Examiner*—John Cabeca
*Assistant Examiner*—Shawn Becker
(74) *Attorney, Agent, or Firm*—Gregory A. Welte

(57) ABSTRACT

Apparatus for accessing a displayable information resource and tailoring retrieved information to a user's requirements comprises a tag reader (18), a decoder (34) for identifying a coded resource address (38) carried by a tag (28), and access means for accessing the identified resource. A display means (14, 22, 24, 48) displays information loaded from the accessed information resource. The disclosed embodiment employs printed RF tag technology, and the information resource is an Internet, intranet or extranet resource whose address (38) is a URL. The disclosed apparatus is embodied in an item of furniture, more specifically a table (10, 52). The tag reader (18) reads a tag (28) when a tagged item (26) is placed onto a support surface (14), and a display is presented by the support surface (14). The tagged item can, for example, be a product or its packaging, a ticket or token, or a letter or information sheet.

10 Claims, 16 Drawing Sheets

(a)

COLLECTING THE TOKEN (b)

THE KITCHEN TABLE (c)

BRINGING THE TOKEN TO THE TABLE (d)

SELECTING THE DESTINATION (e)

WAITING FOR THE BUS (f)

PAYING WITH THE TOKEN (a)

THE CINEMA (b)

BUYING THE TICKET (c)

JOE RETURNS HOME (d)

ONE WEEK LATER . . .

(e)

GOING TO THE CINEMA (a)

(b)

(c)

(d)

(e)

(a)

THE LOCAL SHOP (b)

FOR SALE/NOTICE CARD (c)

SCANNING ONTO THE WEB (d)

PLACING THE AD IN THE WINDOW (e)

(a)

(b)

(c)

(d)

(e)

(f)

1 HAYES CRESCENT

METHOD OF INTERFACING WITH VIRTUAL OBJECTS ON A MAP INCLUDING ITEMS WITH MACHINE-READABLE TAGS

BACKGROUND OF THE INVENTION

This invention relates to information retrieval and display, and contemplates techniques for locating and loading information from resources such as the Internet and displaying the same for review and/or interaction. More specifically, the invention embraces methods for retrieving information, together with display apparatus adapted for that purpose and especially for use in the domestic or commercial environment. The invention extends to methods and apparatus for interacting with the retrieved and displayed information.

The advance of information technology has placed information on almost any topic at the disposal of every suitably-equipped computer user. The Internet especially is undergoing explosive growth, with the result that new web pages and Internet-based services are proliferating in every field.

Web pages can simply contain reference information but increasingly provide interactive facilities for the provision of information, entertainment and Internet-based services. For instance, many banks now offer customers the option of on-line home banking over the Internet. Large stores offer home delivery services, where a customer places an order for specific goods such as groceries over the Internet and the ordered goods are subsequently delivered to the customer's home.

Whilst the expansion of the Internet has brought many benefits and has opened up some remarkable possibilities, it has also encountered the problem of information overload. There is now such a surfeit of information on many topics that irrelevant information obscures the information an Internet user needs to know. Filtering this information adds to what, for many actual and potential users, is the already undesirable complexity of Internet access.

For example, a query presented through an Internet search engine can lead to an overwhelming flood of irrelevant hits that discourages those seeking a quick answer to a simple question. Advanced search options can be used to stem the flood, but they involve input of further, carefully considered search parameters, and are still somewhat hit-and-miss. The user has no convenient way to ensure, as far as possible, that the information immediately displayed will be precisely relevant to his or her needs at that time. To be relevant, such information could be pertinent to the user's locality and/or the time of day, such as a bus or train timetable from the local bus stop or train station. More generally, relevant information could be the subject of whatever issue the user happens to be dealing with at that time, say a bank statement received in that day's mail, on which a query has arisen. Unfortunately, getting to such relevant information can be like finding a needle in a haystack. In particular, the global, borderless character of the Internet renders it ill-equipped readily to provide local information on demand.

Even if the URL of a desired web page is already known and has been bookmarked for easy repetitive access, much irrelevant information can be presented by that web page to the user. Means exist to personalize a web page to the user's perceived needs by, for example, storing a cookie on the user's PC that identifies the user and his or her browsing habits to the server hosting the web page. However, the user's actual information needs can change from day to day or even from hour to hour and so will tend to outstrip any such personalization techniques.

As just one example, a user might visit a web site one day for advice on how to fill in a particularly complex form such as a tax return. A day or two later, the same user might visit that site again for advice on how to fill in another form such as an appendix to the first form. Clearly, it would be more of a hindrance than a help on that second visit if the browser infers from recent experience that the user only wants information relating to the first form. In practice, therefore, the user is presented with a full menu of options on each and every visit, through which the user has to navigate to get to the advice that he or she seeks.

Also, whilst Internet-enabled devices such as mobile telephones are threatening the hegemony of the PC in terms of Internet access, it is still the case for most users that Internet access requires access to a PC. Unless the PC is left on all the time and is connected to the Internet by a fast and expensive telecommunications link such as ISDN, Internet access requires the PC to be booted up, following which a dial-up connection to the user's ISP has to be made and only then can the desired web page be searched for or entered. Even then, there could be layers of menus to be negotiated, possibly exacerbated by security measures, each involving download time in what has come to be known as the 'world wide wait'. It is therefore quite common for several minutes to elapse before the PC is actually ready to help the user with his or her query. This delay further discourages the user from accessing the Internet resources from which he or she could benefit and, if the information requested is time-critical such as a bus or train timetable, can make the system too slow to be of practical use.

More fundamentally, many potential Internet users do not have access to a PC within their domestic environment or are reluctant to use the Internet because of lack of familiarity with the use of computers. PCs are designed primarily as a functional tool for the workplace, and not for household use. They therefore impose the creation of an office environment in the home, and cannot properly handle challenging domestic environments such as the kitchen with its heat, humidity and dirt contamination. Indeed, a PC in the kitchen would generally be regarded as getting in the way, no matter how useful its functionality might be in downloading recipes and so on.

Accordingly, even in households where Internet users have access to a PC, the PC is rarely located in the most convenient domestic environment for use in performing routine domestic activities such as on-line shopping etc. PCs are often located in private spaces within the home, such as a home office or a bedroom, rather than in more public spaces. This environment of use influences who in the household has access to the computer; studies show that, on average, usage still remains male-dominated rather than a shared family activity.

In recent years, the diffusion of home computers has slowed throughout the western world. By way of illustration, on-line PC household penetration in the US has slowed down at around 40%, despite very healthy predictions for home on-line access and ever-failing PC prices. It appears that the PC 'one size fits all' approach to computing does not satisfy the requirements of most consumers, whose lifestyle needs may be better met by alternatives offering ease of use that PCs fail to provide. There is therefore a need to satisfy the home computing needs of the many consumers who do not personally perceive the need for a home PC, or who are dissuaded by its complexity, inconvenience and cost. This need extends to the commercial environment, such in as offices and stores.

The Applicant's studies with discussion groups in the area of so-called relationship technologies have led to many interesting findings. Whilst most participants in such studies have experience of using computers at work, the studies noted a general feeling of uneasiness towards technology. The PC is often seen as being too complicated for most of the computing tasks that users want to perform at home or at work. Even for routine household tasks, the PC is seen as being cumbersome, slow to boot and in the 'wrong' room within the home, a room that is not used frequently. Also, there appears to be a lack of trust in PCs and their reliability. Most participants felt that technology would let them down since, from their experience of PCs at work, computers often 'crashed' or simply did not work properly.

Accordingly, easier to use computing devices have been proposed to drive the next generation of computing within the home and indeed elsewhere. The abovementioned Internet-enabled devices such as mobile telephones aim to simplify Internet access by providing a simple alternative to a PC but still suffer from problems. For example, Internet access is just one of several functions that such devices offer and so a succession of control inputs are necessary to select and to effect Internet access from among the various functions. Of course, once connected to the Internet, the potential problem of information overload remains, no matter how simple and intuitive the operation of the browser apparatus itself might be.

Of course, it helps if the browser software and the device that runs it is indeed simple and intuitive to use. However, for the reasons set out above, neither PCs nor any other known Internet-enabled devices fully meet those requirements. Many laborious steps can lie between reading, say, a URL in a manufacturer's product brochure and successfully obtaining relevant information from the web site thus identified. Transcription errors often occur, or the URL could have changed since the brochure was printed.

Even when the right information has been accessed, the layout of a typical PC or other Internet-enabled device does not lend itself to the most efficient use of that information. It is difficult to share displayed information among two or more users unless they sit beside each other in front of the monitor or other display. Indeed, where two persons sit opposite each other around a desk with a PC monitor on it, as is more typical in a commercial environment such as at an adviser's desk in a bank or a store, the monitor serves to divide rather than to unify. It is similarly difficult for more than one user to interact with the displayed information.

SUMMARY OF THE INVENTION

Against this background and in accordance with this invention, the Inventors have had the insight that the address of an information resource, notably a web address, can be coded onto a machine-readable tag associated with an item to which that information resource relates. The tag can be read automatically to identify and then access the information resource, thereby to extract and display truly relevant information but without putting the user to the trouble of searching for the information resource. For example, as soon as a coded web address is read from a tag by a suitable reader connected to a serial port of a PC or otherwise associated with a browsing apparatus, a browser can be launched to load and display a web page containing information relevant to the item associated with the tag. An application address optionally stored on the tag with the web address may be used to launch the browser application if desired.

The item might represent a product or service, being a product itself or its packaging, a ticket or a receipt, or other general merchandising material such as a brochure, an information sheet or an advertising leaflet. More generally, the item can be printed material of any type, such as a form.

The invention therefore provides a link between items representing products or services, and their related web content. For example, a URL coded on a product or its packaging can access a customer support web site for that product, at which assembly or set-up instructions are available and warranty registration details can be provided. A URL coded on printed material such as a form can access a web adviser that explains how to fill in that form. URLs coded on receipts and tickets can show service details, such as store opening times, timetables, event details or indeed any other information relating to the issuer of the receipt or ticket or the subject or contents of that receipt or ticket.

Whilst the invention provides great benefit in the Internet environment, it is not essential that the information resource is an Internet resource: information could be held on an intranet, an extranet or in a database of any description.

In devising the physical form of the apparatus used to read a tag, launch a browser and display the information thus extracted, the Inventors have considered the abovementioned drawbacks of the PC and its more recent Internet-enabled competitors. The Inventors have concluded that the apparatus of the invention, at least the tag-reading part and preferably the entire apparatus including display and input means, can best be embodied in the form of a multi-purpose item of furniture. That way, the apparatus becomes an integrated part of the living or working environment, and has its normal furniture use in addition to its information-retrieving functionality. Consequently, the apparatus is never perceived as being in the way, and becomes an accepted and indeed indispensable part of daily life.

Most preferably, the item of furniture is a table, which term will be taken, for the purposes of this specification, to encompass other functionally-similar items of furniture such as counters and desks. Tables as defined herein are characterized by a support surface of some kind, which surface is usually generally horizontal. This presents the elegant and highly advantageous possibility of reading the tag on an item when that item is simply placed upon the support surface of the table. This is a remarkably natural, intuitive and convenient way of operating the reader to launch a browser and thereby load the web page appropriate to the item placed on the table.

More preferably still, not only is the item itself displayed on the table when launching the browser, but the retrieved information relevant to that item is also displayed on the table. In the currently preferred embodiment that will be described later, an internal projector projects the display image up onto the underside of the support surface, to be viewed by a user looking down from above and beside the support surface Interaction with the displayed information is another preferred part of the invention. A touch screen overlay on the support surface is currently envisaged, enabling icons or a virtual keypad to be pressed as necessary to interact with the display.

The inventive concept can therefore be expressed in various ways. From one aspect, the invention resides in an item for which a related displayable information resource exists, the item having a machine-readable tag onto which the address of the information resource is coded for access to the information resource upon machine-reading the address. This aspect of the invention also embraces a coded machine-readable tag for attachment to or incorporation into an item relating to a displayable information resource whose address is coded onto the tag, and a method of coding such a tag comprising coding an address of a displayable information resource onto the tag.

The invention extends to apparatus for accessing a displayable information resource, the apparatus comprising a tag reader, a decoder for identifying a coded information resource address carried by the tag, and access means for accessing the identified information resource. The apparatus preferably further comprises display means for displaying information loaded from the accessed information resource, the display means advantageously being associated with control input means such as a touch screen overlay.

Whilst any or all of the above components of the apparatus could be distributed around a plurality of interconnected units, it is much preferred that all of those components are integrated in a single appliance that, more preferably, is embodied in an item of furniture such as a table. In any event, the tag reader is preferably operable to read a tag when the item is placed onto a support surface of the apparatus. The tag reader may be a reader/writer to allow data to be written to the tag.

The invention also embraces the related method of accessing a displayable information resource that relates to an item, comprising reading a tag carried by the item, identifying an information resource address carried by the tag, and accessing the identified information resource. The method will generally further comprise displaying information relating to the item loaded from the accessed information resource, although the nature of that display is not essential within the broad inventive concept. In method terms, the operation of reading the tag preferably takes place upon placing the item onto a support surface, and the further operations of the method follow on automatically from that initial operation so that those further operations, too, are ultimately triggered by placing the item onto the support surface. An element of manual control is, of course, possible if desired, such as manually enabling any of the operations of the method.

The invention can also be expressed in terms of a method of tailoring retrieved information to a user's requirements, comprising the user gathering items that relate to the user's potential information needs, each item having a machine-readable tag onto which the address of a displayable information resource is coded, and accessing the information resource by machine-reading the address on the tag.

In the invention, a tag is seen as a discrete component that can be applied to or incorporated into an item, the tag thus having a distinct character from the item to which it is applied. For example, a tag code programmed into a memory storage device such as a CD-ROM would not be regarded as having a distinct character from that item, although like any product, a physical tag could be applied to such an item to obtain the benefits of the invention.

In its broadest sense, the invention contemplates a wide range of machine-readable, encoded tags that can be applied to or incorporated into an item. It would be possible, for example, to employ bar code technology. There is no cheaper machine-readable tag. However, bar codes suffer problems in integrity of read operations due to optical difficulties, particularly the need for line-of-sight presentation within a limited range of orientations with respect to the reader. More generally, bar code systems are prone to dirt build-up, ink bleeding, stray marks, dropouts and warping or tearing of the label or other substrate to which the bar code is applied. Bar coded information cannot be erased, rewritten or appended unless one replaces the bar code entirely, and bar codes can so easily be copied as to present no real barrier to counterfeit use or a security breach.

For these reasons, the Inventors envisage particular advantages for silicon-based ID tag technology, specifically RF tags (RFID) that solve or at least mitigate all of the above problems of bar codes. In RFID applications, a reader (which can be a reader/writer) generates an excitation field that serves as both the tag's source of power and its master clock. Thus activated when in range of the reader, the tag cyclically modulates its data contents and transmits them to a receiver circuit within the reader. The reader demodulates and decodes the data signal and provides a formatted data packet for further processing by a host computer.

Wireless programming is a particularly advantageous option offered by RFID read/write systems. It enables the memory in a tag to be configured, updated, erased, rewritten or appended by a suitable RF reader/writer at any time in the life of the tag or of the item with which the tag is associated. So, a tag can be programmed just before the associated item is given to the user, thus ensuring that the information it contains is up to date and appropriate to the user's needs at that time.

Whilst cross-platform RFID standards have not yet been developed, the Inventors especially favor RFID tags that embody the BiStatix technology announced by Motorola, Inc. in March 1999 through its subsidiary, Indala Corporation. The names BiStatix, Motorola and Indala are all acknowledged as trade marks.

Full particulars of BiStatix technology are available at Indala's web site whose home page is currently at http://129.188.106.11/LMPS/Indala/index.html. Briefly, BiStatix works on a capacitive coupling principle as opposed to the inductive principle of normal RFID systems. A BiStatix tag simply comprises a small, thin silicon chip, less than 3 mm$^2$ in surface area and less than 250 microns thick, attached to printed electrodes of, for example, carbon ink that serve as antennae for wireless communication between the chip and a suitable reader.

The chip and the electrodes are disposed on a substrate that can be flexible, for example on the reverse of a paper label whose opposite, exposed face can bear human-readable information, preferably in natural language, and possibly also bar-coded information for compatibility with an existing tag system. In this form, the BiStatix tag is flat and very thin, almost undetectably so. It is easy and cheap to make, and simple to apply to an item or to integrate with an existing item. This applies especially to an existing printed item like a form, ticket, token or information sheet because the BiStatix printing technique can simply be integrated with the existing printing process. The tag is tolerant of flexing, creasing and folding and is generally robust, even if the electrodes are torn or otherwise damaged: so long as an effective remnant of the electrodes remains attached to the silicon chip and the chip itself remains intact, the tag will remain functional.

Of course, it is also possible to apply the components of a BiStatix tag to a relatively stiff substrate such as a laminated ID card.

Whilst it is accepted that no silicon-based technology can compare strictly cost-wise with a bar code, a BiStatix tag comes close enough to a bar code in terms of cost that its technical benefits outweigh the additional cost while allowing use of the tags in high-volume, disposable applications. The BiStatix tag may therefore be considered as a next-generation bar code. Importantly for the purposes of the invention, BiStatix technology promises to provide sufficient memory capacity to store most if not all typical URLs. Present BiStatix tags are programmable with up to 120 ASCII characters, and greater capacity can be expected in future developments.

Accordingly, in conceptual terms, it is preferred that the tag technology used in the invention is RF and more preferably involves the use of a printed tag such as is proposed by Motorola/Indala under the trade mark BiStatix.

Further aspects of the invention relate to user interface techniques that are powerful and yet simple and intuitive. One such aspect can be expressed as an interface method for use in accessing a displayable information resource, the method comprising displaying to a user a map showing the environs of a physical base location that the user lives in, works in or visits frequently during day-to-day life, and placing on that map interactive virtual objects representing facilities with which the user can interact when in and around that base location. This aspect may also be expressed as apparatus for accessing a displayable information resource, the apparatus having a user interface comprising a display and control input means associated with the display and further including means for generating and displaying a map showing the environs of a physical base location that the user lives in, works in or visits frequently during day-to-day life, and interactive virtual objects placed on that map to represent facilities with which the user can interact when in and around that base location.

The virtual objects are suitably located on the map at positions corresponding to facilities in and around the base location represented by the map, and preferably represent facilities with which the user has a history of interaction. Specifically, the selection of virtual objects can be tailored by the user's history of interaction with the facilities represented by those virtual objects. This can be achieved as aforesaid by the user gathering items that relate to the facilities with which the user has interacted, each item having a machine-readable tag that contains information relating to the respective facility, or an address of a resource for such information.

A virtual object can be created on first reading a tagged item that relates to a facility, and that virtual object can be stored and displayed again on reading another tagged item that relates to the same facility.

Preferred embodiments of the map contain a first virtual object representing the user's home, workplace or other base location. It is possible simultaneously to display on the map a second virtual object representing a facility with which the user can interact and showing the relative position of that facility with respect to the base location. When the second virtual object appears in the display, the display of the map advantageously zooms out from the first virtual object to encompass the second virtual object in the same display.

The user can interact with the displayed virtual object by touching or clicking on a part of the object, and moreover can control the interaction by touching or clicking on different parts of the displayed virtual object. To facilitate this, the method of the invention preferably comprises zooming in on a selected displayed virtual object.

A window or menu can be superimposed on the map display, and the virtual objects can be superimposed on a virtual streetscape.

The apparatus of the invention suitably includes means for creating and/or displaying an appropriate virtual object upon reading a tagged item, using various tag-reading facilities as aforesaid.

A further interface method for use in accessing a displayable information resource that relates to an item comprises machine-reading a tag carried by the item and in response to the data carried by the tag, displaying an interactive virtual image of the item for interaction by a user to access the information resource. The method may, for example, comprise identifying an information resource address carried by the tag, and accessing the identified information resource to download the interactive virtual image of the item.

This method can be performed using apparatus having a user interface comprising a display and control input means associated with the display and further including a tag reader for reading a tag associated with an item and means responsive to the tag reader for generating and displaying an interactive virtual image of the item for interaction by a user to access the information resource.

In an elegant arrangement, indicia displayed on the virtual image of the item constitutes a menu of links to related information resources, and the indicia on the virtual image preferably corresponds to indicia upon the item. The indicia can comprise words, phrases, icons or graphical matter applied to the virtual image; where the indicia includes a word, that word preferably links to an information resource relating to the meaning of that word.

As before, the user suitably interacts with the virtual image by touching or clicking on a screen that displays the image. Where indicia on the virtual image links to particular information resources, the user accesses those information resources by touching or clicking on a part of the screen corresponding to the related indicia.

This aspect of the invention can also be expressed within the inventive concept as a method of advertising or marketing, comprising providing a tagged item that is a physical symbol of a supplier, machine-reading a tag carried by the item and in response to the data carried by the tag, displaying an interactive virtual image of the item for interaction by a user to access an information resource relating to the item or the supplier. The tagged item is preferably a product of the supplier.

BRIEF DESCRIPTION OF THE DRAWINGS

In order that this invention can be more readily understood, reference will now be made, by way of example, to the accompanying drawings in which.

DETAILED DESCRIPTION

Figure 1:
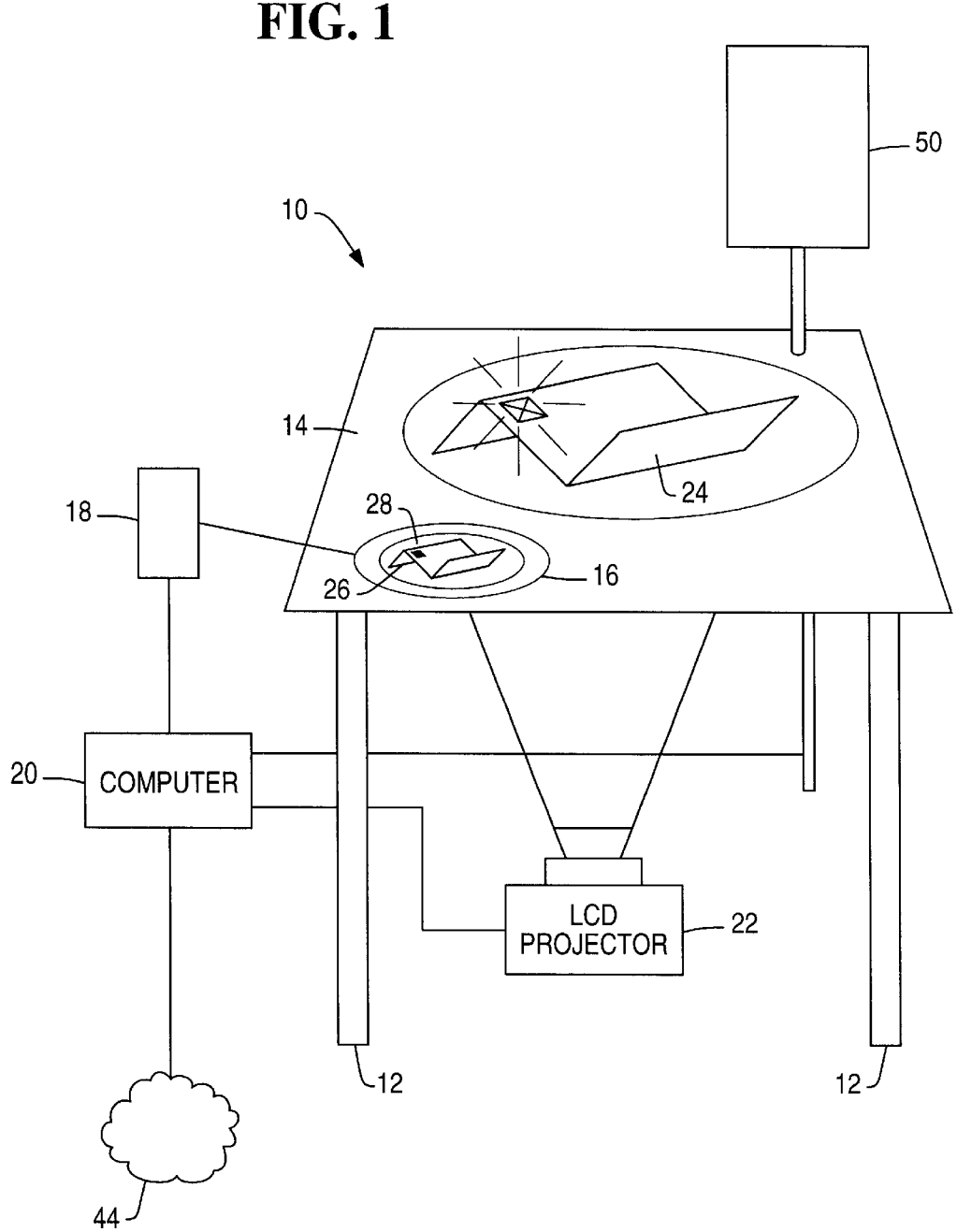
FIG. 1 is a schematic perspective view of a prototype embodiment of the invention in the guise of a kitchen table.
Figure 2:
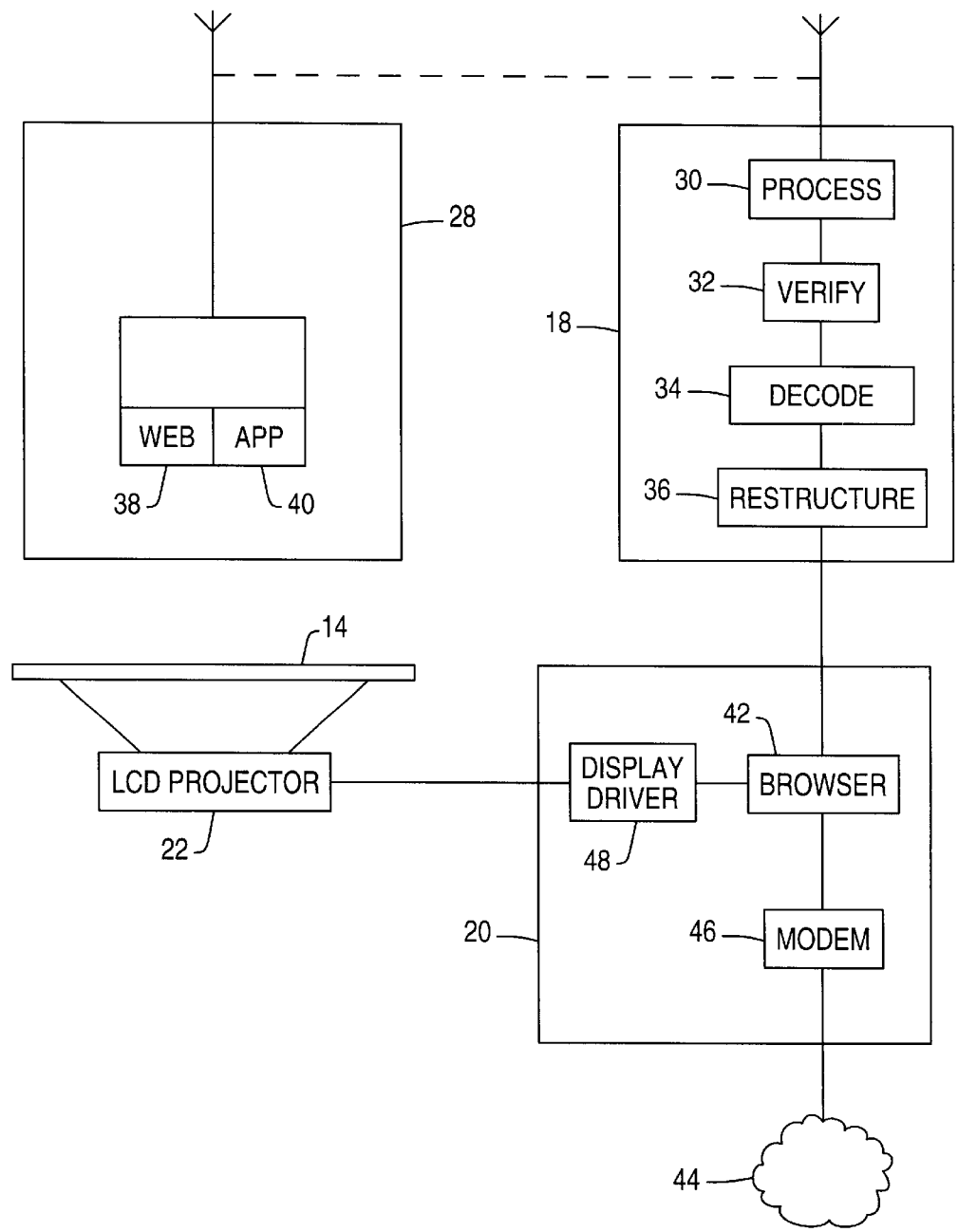
FIG. 2 is a block diagram showing the operation of the embodiment of FIG. 1 in reading a tag, launching a browser and displaying information pertinent to the tag.

Referring firstly to FIGS. 1 and 2 of the drawings, tag-reader apparatus in accordance with the invention is embodied in the form of a table 10 suitable for use in a kitchen environment. The table 10 has legs 12 supporting an oblong glass top 14. The glass top 14 presents a scratch-resistant wipe-clean upper supporting surface capable of surviving the trials of kitchen life.

Situated in a protected position offset to one corner under the glass top 14 of the table 10, an excitation coil 16 of a tag reader 18 provides outputs to a PC 20. As aforementioned, the tag reader 18 could be a reader/writer, in which case the reader 18 will also take inputs from the PC 20. The PC 20, in turn, drives an LCD projector 22 arranged to project a display image 24 upwardly onto the underside of the glass top 14, to be viewed from above by a user standing or sitting to one side of the table 10. The display image 24 occupies a portion of the table top 14 not occupied by the excitation coil 16, so that neither the coil 16 nor a tagged item 26 placed upon it need obscure the display image 24.

The PC 20 is described as such for simplicity because it includes the essential PC elements such as a CPU, memory and I/O means (not shown), even though the external layout of a typical PC would not, in general, be adopted in a production apparatus.

When the tag reader 18 is on, as is envisaged will be the normal state of the table 10, the excitation coil 16 generates an excitation field extending over at least part of the upper surface of the table 10. A BiStatix tag 28 that is placed upon that part of the table 10 with its associated item 26 (in this case a printed sheet such as a letter) comes within that excitation field and so its chip is powered up and activated to identify itself to the reader 18 via the printed electrodes that constitute tag antennae.

An antenna associated with the tag reader and/or the excitation coil 16 receives the electromagnetic emissions from the tag antennae and converts them back into electrical form for detection and processing by receiving circuitry within the reader 18. Specific reference is made to FIG. 2 at this point. Once the tag data has been processed at 30, the reader 18 firstly checks to verify at 32 that the signal received is valid and if it is valid, the data in the received signal is decoded at 34 and restructured at 36 into a format suitable for input to the PC 20. The data could, for example, be input through a serial port of the PC 20.

In this preferred embodiment, the identification data stored in tag 28 includes a web address 38 and an application address 40 so that, upon receiving the restructured data from the reader 18, the PC 20 launches a browser application 42 appropriate to the application address 40 and instructs that browser 42 to locate and load from the Internet 44 via a modem 46 a web page appropriate to the specified web address. Once the web page is loaded, a display driver 48 implemented within the PC 20 causes the LCD projector 22 to project the web page up onto the underside of the glass top 14, to be viewed by a user and optionally interacted with by means of e.g. a touch screen overlay (not shown) or other sensors.

The excitation field generated by the excitation coil 16 extends over the upper surface of the table 10 at least within the perimeter of the coil 16. Possibly, however, depending upon the configuration and power of the coil 16 and the tag reader 18, the effective range of the excitation field will extend to the immediate environs of the table 10, so that merely bringing a tag-equipped item near to the table 10 will activate the projected display 24 as desired.

An auxiliary LCD display screen 50 also driven by the PC 20 stands above the table top 14 to show the state or mode of the table 10. A touch-screen control interface could be incorporated into this display 50 if desired.

Figure 3:
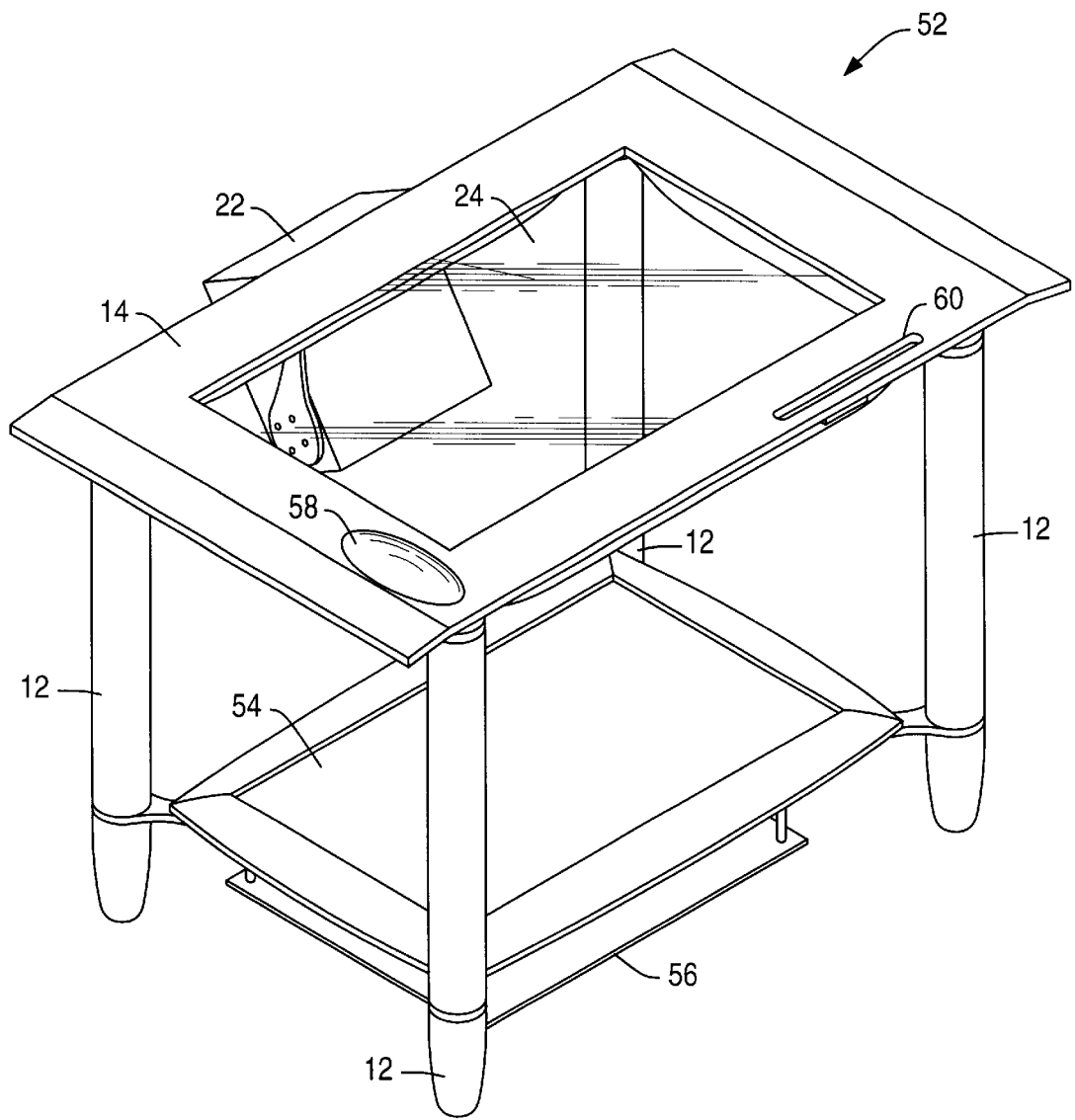
FIG. 3 is a perspective view of a prototype table in accordance with the invention.

FIG. 3 illustrates a prototype table 52 that shares many of the features of the table 10 shown in FIG. 1, so like numerals are used for like parts. One difference is that the auxiliary display 50 of FIG. 1 has been omitted, its function instead being integrated with the projected display 24. Another difference is that the projector 22 is situated beside the table top 14 and projects downwardly onto a reflector 54 that reflects the projected image back up to the underside of the table top 14 to generate the projected display 24. A shelf 56 hangs below the reflector 54 for storage purposes.

A further difference is that there are two excitation coils 16. Those coils are not visible in the external view of FIG. 3 but one coil, designated by an elliptical marker 58, is offset towards one corner of the table top 14 to read tags of items placed on the table 52 at that location. This is akin to the arrangement shown in FIG. 1. The other coil lies beneath a slot 60 that penetrates the table top 14 adjacent a long edge thereof, thereby to read tags of thin items such as vouchers, tickets, forms, letters and so on that may be inserted into the slot 60. Such items can be left in the slot 60 and withdrawn after tag reading, but once its tag has been read, an item preferably falls through the slot 60 into a receptacle (not shown) that can be removed from time to time and emptied into a refuse bin. In this way, the table 52 helps to remove clutter, enabling a user effectively to discard an item at the same time as recording its particulars via the table 52.

It is emphasized that the tables 10 and 52 illustrated in FIGS. 1 and 3 are prototype configurations and that, in practice, the tag reader 18, PC 20 and LCD projector 22 would probably be housed in a hollow cabinet disposed under the glass top 14, the top being sealed to the cabinet to the extent necessary to prevent undue ingress of the moisture and other contaminants common in a kitchen environment. Beneficially in that case, the top 14 would overlap the edges of the cabinet so that spillages spilling over the edge of the top 14 will tend to fall onto the floor rather than run into the cabinet, where they could cause damage to the components within.

A series of story boards now follows to illustrate some of the many novel possibilities offered by the invention.

The first story board is illustrated in FIGS. 4(a) to 4(f). In FIG. 4(a), a user collects a token upon alighting from a bus. The token holds a tag encoding a web address, and could equally well be a ticket given to the user upon boarding the bus. Once the user gets home with the token, the table is initially inactive or dormant as shown in FIG. 4(b), simply serving its function as furniture, but once the user brings the token to the table as shown in FIG. 4(c), the table reads the tag and automatically comes to life, linking to the appropriate web site and downloading appropriate instructions for display.

To enable adequately fast response upon activation, it is preferred that the table has a standby mode in which the display is off or in a screensaver mode but the PC is fully operational. It is further preferred that the table is connected to the user's ISP by a fast, essentially 'always on' connection such as is allowed by an ISDN or optical cable telecommunications infrastructure. However, even if such a connection is not available, the invention will bring benefits by accessing relevant information immediately upon dialing in to the user's ISP.

In this instance, by use of the global positioning system (GPS) or a network of roadside transponders, the bus company knows the location of each and every working bus in its fleet. Accordingly, the selected web site linked to the bus company's location system can present a live, real-time street map of the buses and their positions. The table therefore gives the location of the bus company's routes, and the buses on those routes, in relation to the user's home. This is the entry point to the map, from which the user can zoom out to select any destination by interacting with the touch screen display. This is all in contrast to the existing situation in which the user would have to visit a bus stop to look up the inevitably less accurate timetable displayed there, as shown in FIG. 4(d).

When the appropriate destination has been selected, control inputs can be made via the touch screen to make an appropriate fare payment transaction. Confirmation of the transaction can be written to the tag held by the token. It is then just a matter of waiting as shown in FIG. 4(e) for the desired bus to approach the user's home, whereupon the user can set off just in time to meet the bus at the nearest bus stop. The token with confirmation of payment can then be read upon boarding the bus, as shown in FIG. 4(f). The payment credited to the token could alternatively be credited to a personal digital assistant (PDA) or an electronic wallet, which can similarly be read upon boarding to confirm pre-payment for the journey.

The tag held by the token preferably identifies the bus route of interest to the user and so, if the user wishes, enables the web site to present only information of relevance to that route. This is an indication of how the already user-specific information presented by the invention may be personalized further to suit the user's needs.

A further and more detailed bus-user scenario will be described later, with reference to FIGS. 14 to 17 of the drawings.

Moving on now to FIGS. 5(a) to 5(e), the tag in this instance is held by a cinema ticket issued by a cinema that the user visits and returns home from as shown in FIGS. 5(a) to 5(c). The user keeps the ticket until, a week later as shown in FIG. 5(d), the user places the ticket on the table. The table is thereby caused to load and display the cinema's web site, where the user can read reviews, order tickets and pick seats for showings of the latest film releases. In conventional fashion, the web site may include links to other related sites, through which the user can 'surf' at his leisure.

Figure 4:
FIGS. 4(a) to 4(f) constitute a story board that illustrates a bus trip scenario employing the invention.
Figure 4:
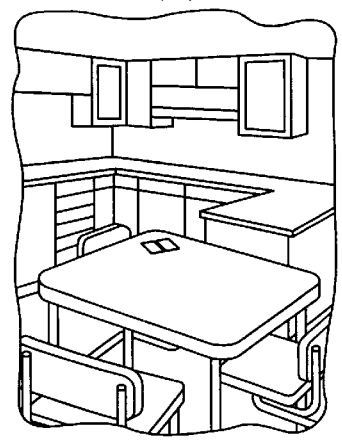
Figure 4:
Figure 4:
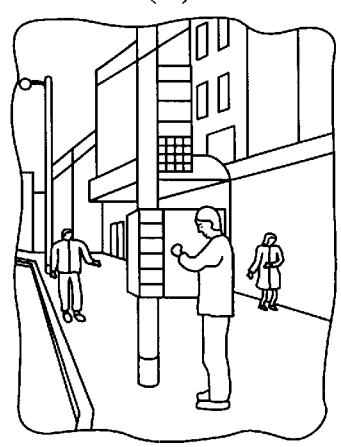
Figure 4:
Figure 4:
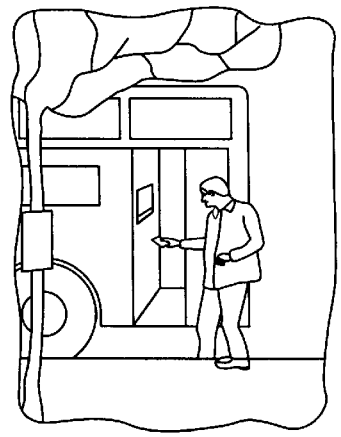

As with the bus ticket of the first story board shown in FIG. 4, the user can use the table to pre-pay for his next visit to the cinema shown in FIG. 5(e), re-using the ticket with its tag memory suitably amended or using a PDA or electronic wallet instead to store and upload the payment and any related seat reservation upon arriving at the cinema.

Again, a further and more detailed cinema-goer scenario will be described later, with reference to FIGS. 18 to 20 of the drawings.

FIGS. 6(a) to 6(e) illustrate how the invention fits in to a cooking/shopping scenario, and contemplate that the user has decided to cook a meal at home for some friends, for example upon visiting a store to witness a demonstration by a chef. During this visit, the user obtained a recipe token from the store, used it to order the ingredients necessary for the proposed meal, and took the token home with the ingredients.

The token carries a tag for identifying an information resource that will guide the user when cooking the meal. So, in FIG. 6(a), the recipe token has been placed onto the table to launch a browser that accesses an animated web site at which a chef takes the user step-by-step through the recipe as shown in FIG. 6(b), the user interacting with the display as necessary to produce the meal as shown in FIG. 6(c).

So good was the meal that a week or two later, the user wants to make a similar meal for other friends. However, the user does not have time to visit the store to get the ingredients and so wants to ask for home delivery from the store. The user interacts with the display by selecting the recipe, either by placing the recipe token, if retained, onto the table top or by recalling the recipe from memory within the table or on a web resource. Then, the user simply specifies the number of people he needs to feed as shown in FIG. 6(d) and the approximate time he wants the delivery to arrive. This information is transmitted back across the Internet or via e-mail to the store, whereupon a delivery van comes from the store at the appointed hour as shown in FIG. 6(e).

Another shopping scenario will be described in more detail later, with reference to FIGS. 21 and 22 of the drawings.

Figure 7:
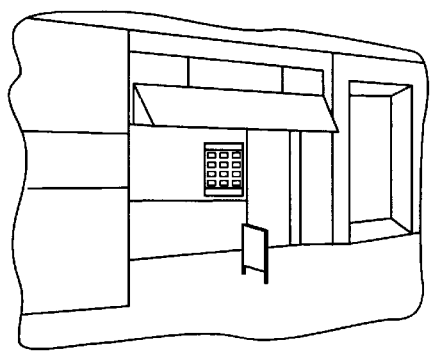
FIGS. 7(a) to 7(e) constitute a story board that illustrates a selling scenario employing the invention.
Figure 7:
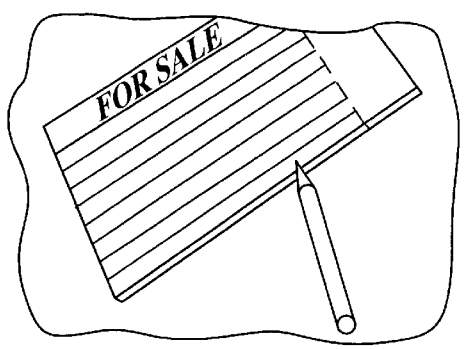
Figure 7:
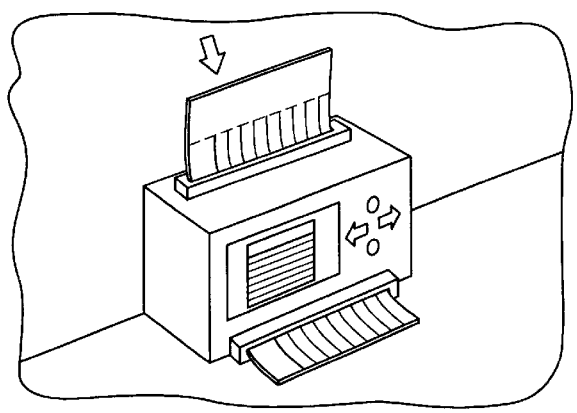
Figure 7:
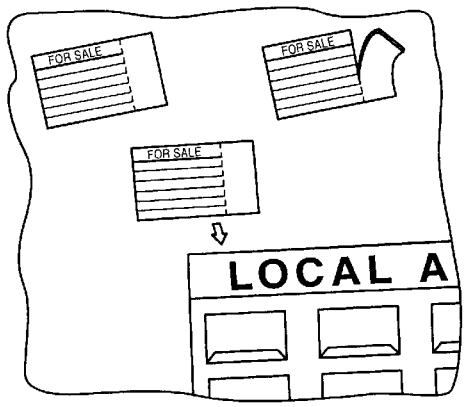
Figure 7:
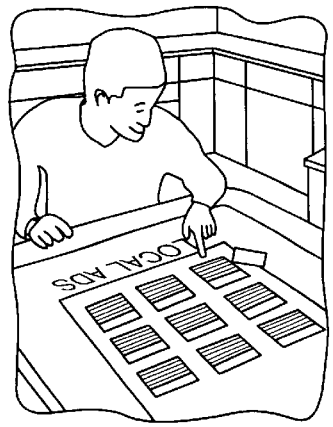

Turning now to FIGS. 7(a) to 7(e), the user wishes to sell his bicycle and decides to do so by visiting his local store (FIG. 7(a)) and placing an advertisement card in a notice board in the front window of the store. The advertisement card (FIG. 7(b)) has two main parts. The user writes on one part to fill in particulars of the bicycle and the price at which it is offered. This part is displayed in the store window notice board. The other part is a tear-off section holding a tag that identifies a web address corresponding to the notice board. The user takes this tear-off section home for use with the table. There could be other removable parts associated with the first part, such as a tag address section to be taken by people who visit the store and see the advert.

Not only is the first part of the advertisement card displayed in the notice board, but before being placed there, its contents are scanned in by a scanner as shown in FIG. 7(c) that makes a digital copy of the card and places that copy into the notice board web site. Optionally, the shopkeeper selects how long the card should remain on display on the notice board and, in virtual form, on the corresponding web site, so that a reminder can be generated to remove the card from the notice board at the appropriate time.

Once scanned in this way, the parts of the advertisement card are separated as shown in FIG. 7(d). The first part of the card is placed into the notice board and the second part is handed to the user who takes it home as aforesaid. When the user wants to view the notice board web site to check that the advert is correctly placed and to see if any buyers are interested, it is simply a matter of placing the second part of the advertisement card onto the table as shown in FIG. 7(e), whereupon the appropriate web site is loaded and displayed for review and interaction.

Figure 8:
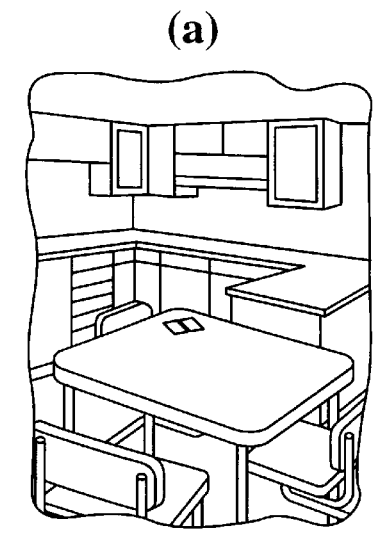
FIGS. 8(a) to 8(c) constitute a story board that illustrates a banking scenario employing the invention.
Figure 8:
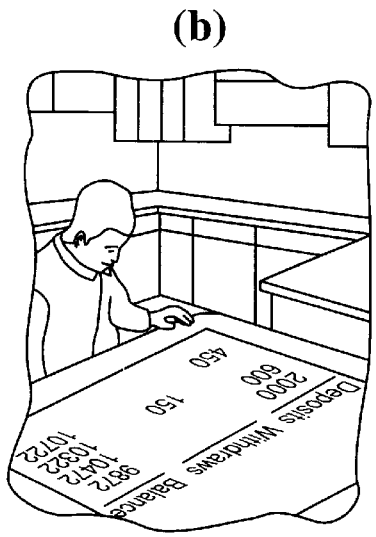
Figure 8:

FIGS. 8(a) to 8(c) illustrate a banking scenario in which the user receives a mailed bank statement, either automatically or upon specific request. The bank statement has a tag that launches an online banking service when the statement is placed upon the previously-dormant table as shown in FIG. 8(*a*). This service shows an interactive visualization of the user's recent and projected banking and savings transactions as shown in FIGS. 8(*b*) and 8(*c*), giving the user a better understanding of his finances and a new level of control over them.

Figure 9:
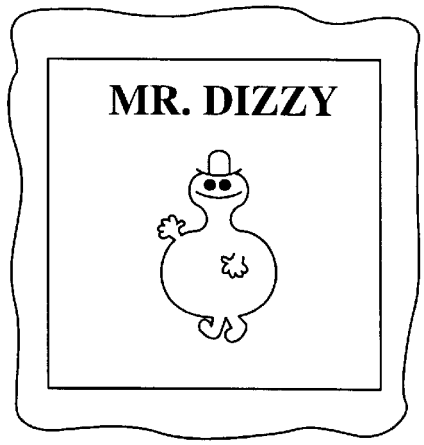
FIGS. 9(a) to 9(f) constitute a story board that illustrates a domestic learning/play scenario employing the invention.
Figure 9:
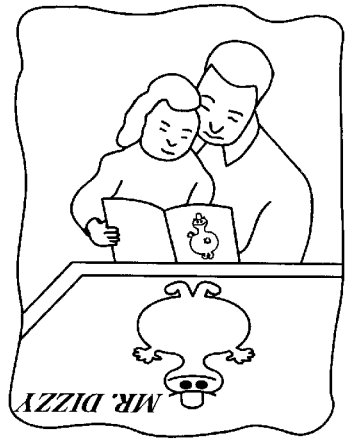
Figure 9:
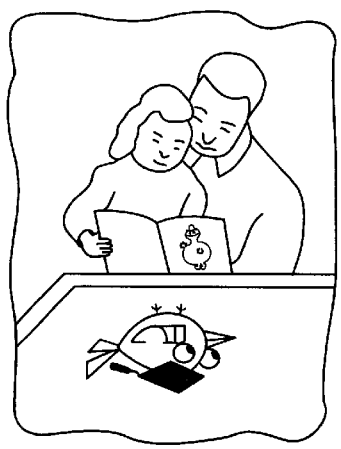
Figure 9:
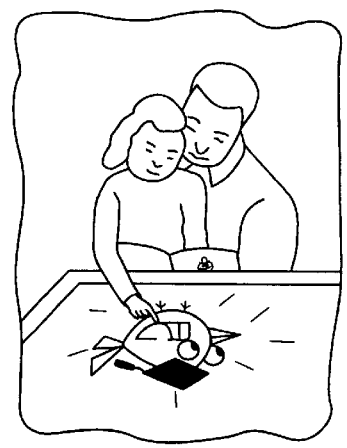
Figure 9:
Figure 9:
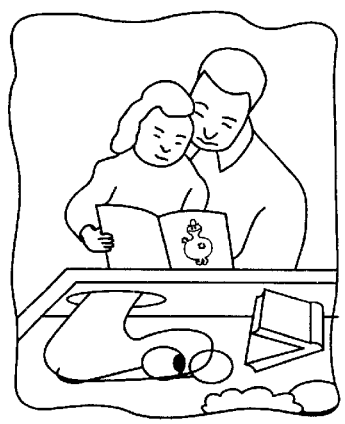

In the final storyboard, FIGS. 9(*a*) to 9(*f*) illustrate an interactive learning/play scenario. In this scenario, a children's book (FIG. 9(*a*)), whose trade marks are acknowledged, is tagged so that when the book is brought to the table and placed upon it or even near it as shown in FIG. 9(*b*), an Internet address and application are read and acted upon to access and display an animated web site relating to that book and its characters. The animated characters develop with time and as the child progresses through the book, as shown in FIG. 9(*c*), and the characters preferably respond to interaction such as touching the appropriate part of the display whereupon the appropriate character responds by moving. For example, the bird of FIG. 9(*c*) is touched in FIG. 9(*d*) and seemingly flies around the display as shown in FIG. 9(*e*). A new interactive animation preferably appears for each new page of the book, as shown in FIG. 9(*f*).

It will be apparent that the information presented on the table both supports and reinforces the narrative of the book, greatly improving the learning and play experience for child and adult alike.

Referring now to FIGS. 10 to 23, these figures illustrate other bus-user, cinema-goer and shopping scenarios to illustrate other aspects of the invention. In particular, these figures show the advantageous ways in which the table 52 of FIG. 3 can display information and interact with the user within those scenarios, presenting novel and beneficial user interfaces. All of the trade marks used in the examples of FIGS. 10 to 23 and mentioned herein are acknowledged.

Figure 10:
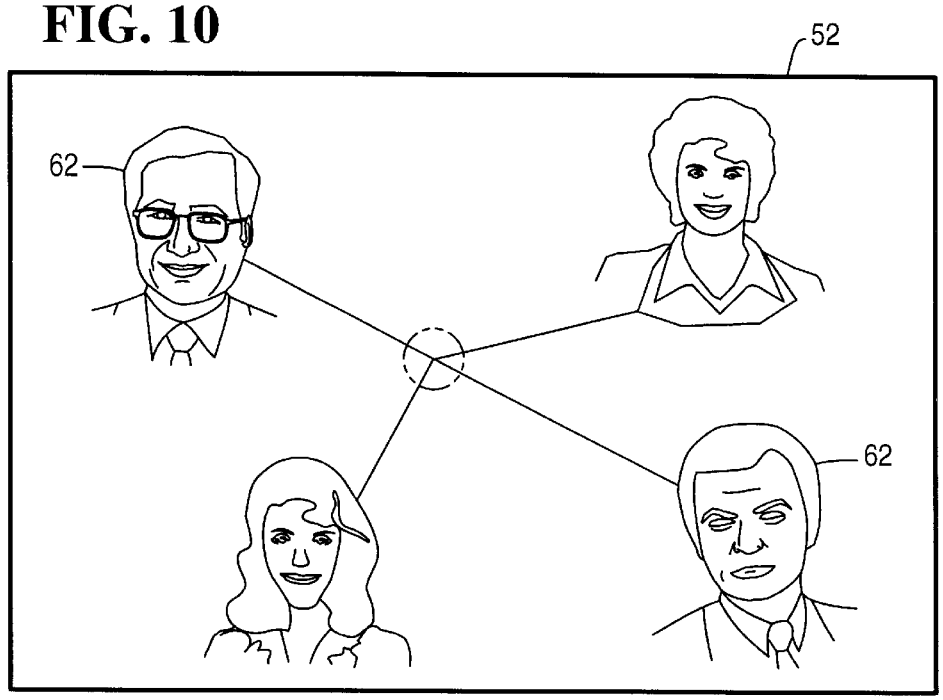
FIG. 10 is a view of the table of FIG. 3 displaying an initial menu constituted by a set of family pictures.

FIG. 10 shows the table 52 displaying an initial menu comprising pictures of the faces 62 of the family or other group of persons that owns or uses the table 52. In a preferred embodiment, each face 62 is an animated representation such as a movie clip file. A member of the family can use the touch-screen overlay on the display to configure the table 52 to suit their needs and preferences, simply by touching the appropriate face 62 in the initial menu. This loads a stored configuration identified with that user in terms of his or her preferred style and function, and also loads that user's stored history of activities. This loading of information can take place from internal memory within the table 52 and/or by downloads from the Internet, intranet, extranet or other information network to which the table 52 is connected.

Figure 11:
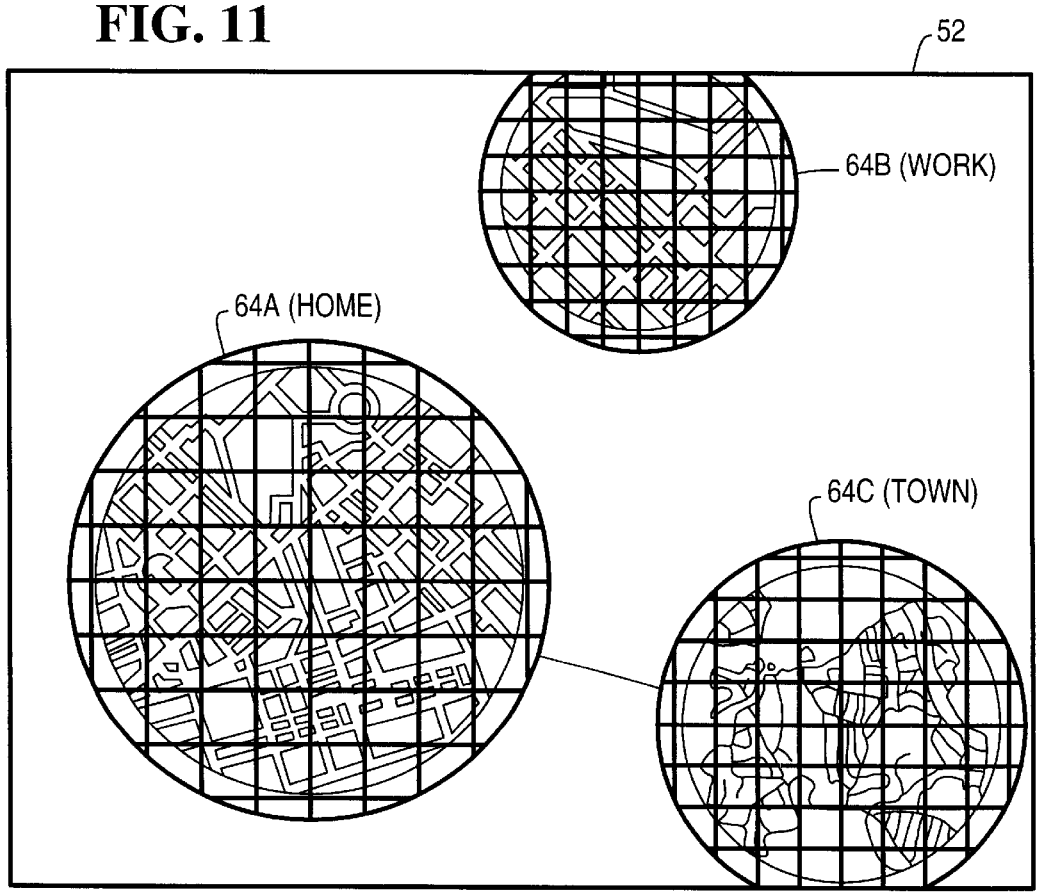
FIG. 11 is a view of the table of FIG. 3 displaying a sub-menu constituted by a selection of virtual maps.

When the user has identified himself or herself to the table 52 in this way, the menu is replaced by a selection of stylized virtual maps 64 as shown in FIG. 11. There are three such maps in the example, a first map 64A being a representation of the user's home environment, a second map 64B being a representation of the user's work environment, and a third map 64C being a representation of the user's town environment for leisure purposes. There could be more or less maps 64, just as their titles and subjects could be changed to suit different user circumstances. For example, if the user is a child or young adult who is not yet in full-time employment, the work map 64B could be a school map or a college map.

The purpose of each map 64 is to show the environs of a respective physical location that the user lives in, works in or visits frequently during day-to-day life, and to act as a framework for virtual objects representing services, facilities and so on with which the user interacts when in and around that physical location. Over time, as the system learns about the user's life as aforesaid, the virtual objects increase in number until eventually the map represents a complex virtual environment. This virtual environment corresponds to the user's physical environment and reflects the user's typical interaction with his or her physical environment, but on an enhanced level that intuitively eases the user's interaction with the various services and facilities represented by the virtual objects. The maps 64 can therefore be understood as a sub-menu giving access to various aspects of the user's life, defined with reference to the principal locations between which the user habitually travels and at which the user spends most of his or her life. Using the touch-screen overlay, each map 64 can be touched to illustrate its respective aspect of the user's life.

The map interface concept is best understood with reference to examples, which will now be illustrated and described.

Figure 12:
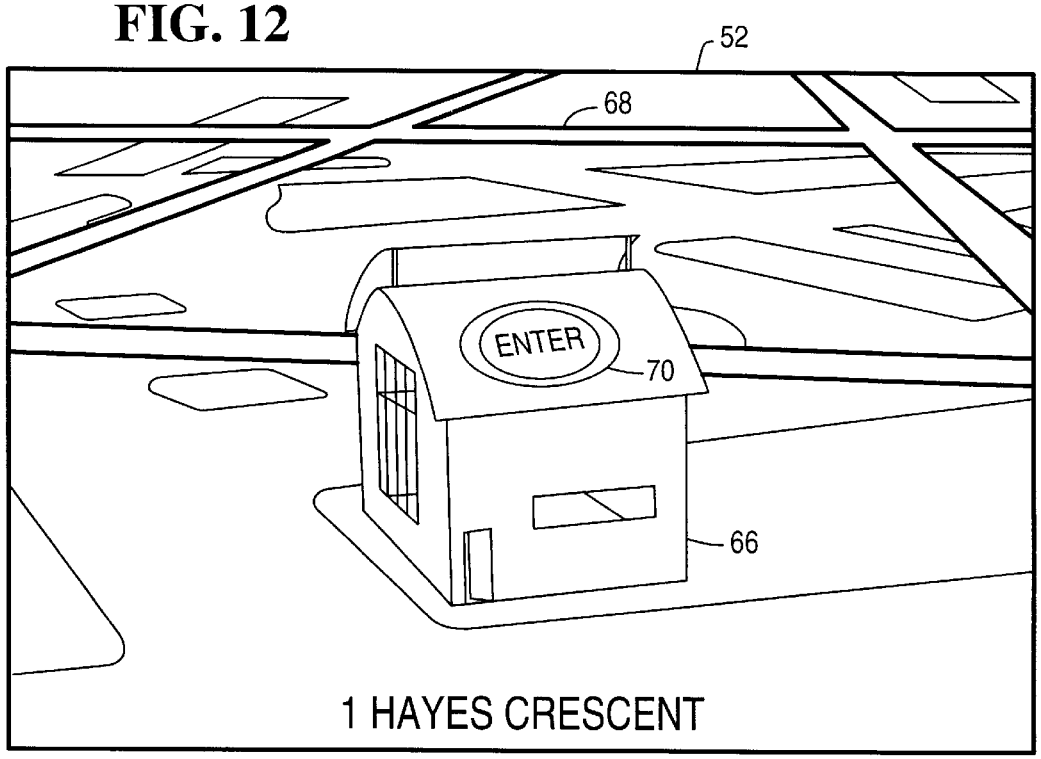
FIGS. 12 and 13 are views of the table of FIG. 3 displaying an interface that represents the exterior and interior of a virtual dwelling.

FIG. 12 shows the initial result of touching the 'home' map 64A: a virtual representation of a house 66 or other dwelling appears, this being the user's home as confirmed by the user's address displayed underneath, in this example '1 Hayes Crescent'. The identity of the user's home can be derived from the identity of the computer that drives the table 52, which in the Internet context will be expressed under the TCP/IP protocol. The virtual house 66 appears in perspective view against a street map background that represents the actual street layout around the user's home. Grid lines 68 can be superimposed on the street map as shown.

Figure 13:
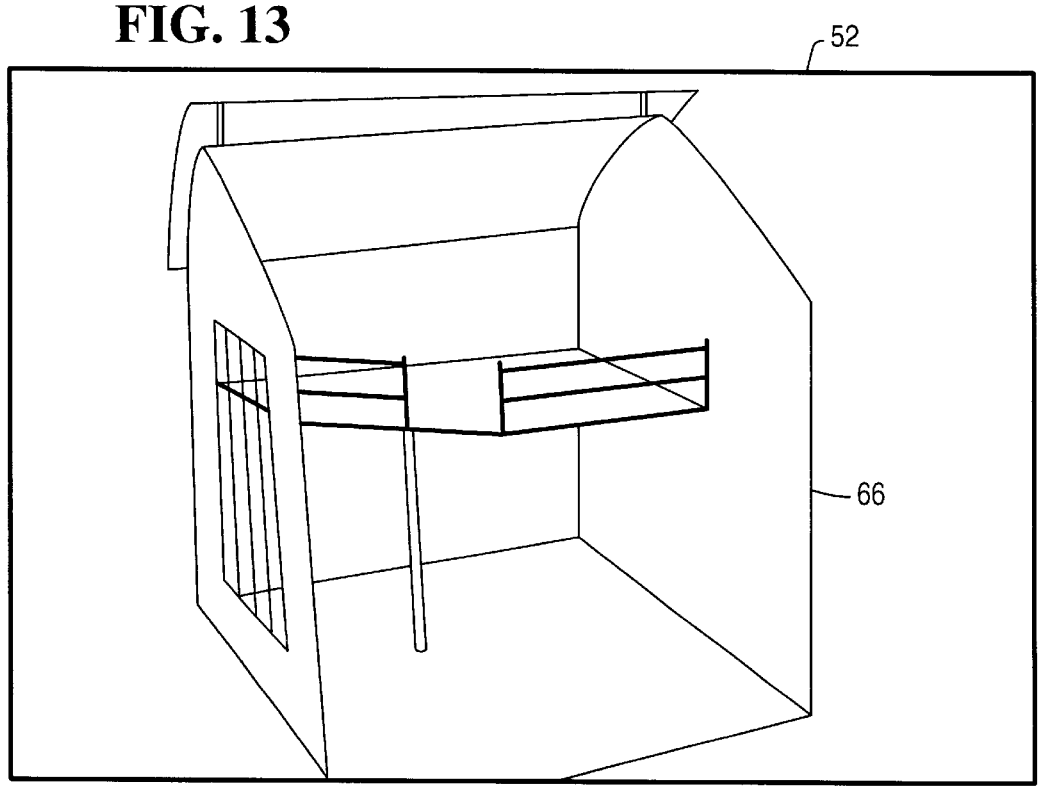

An 'enter' icon 70 on the roof of the virtual house 66 can be touched to cause the house 66 to open, giving access to a virtual interior as shown in FIG. 13 in which icons (not shown) can be placed to represent various other locations such as rooms within the house 66 and objects, such as items of furniture, within those rooms. For example, it would be possible to have a bookcase icon appear within a virtual room and for the 'bookcase', when touched, to display a row of book icons that can be touched to select and display a particular book stored in internal memory within the table or downloaded by the table from an appropriate URL. It would also be possible for an icon to represent an appliance such as a washing machine that, when touched, loads warranty information or user instructions stored in internal memory or downloaded from an appropriate URL. It will be recalled that the existence of such items within the user's home can be programmed in to the table and/or uploaded to an Internet resource simply by reading a tag on, for example, the paperwork that came with the washing machine.

Figure 14:
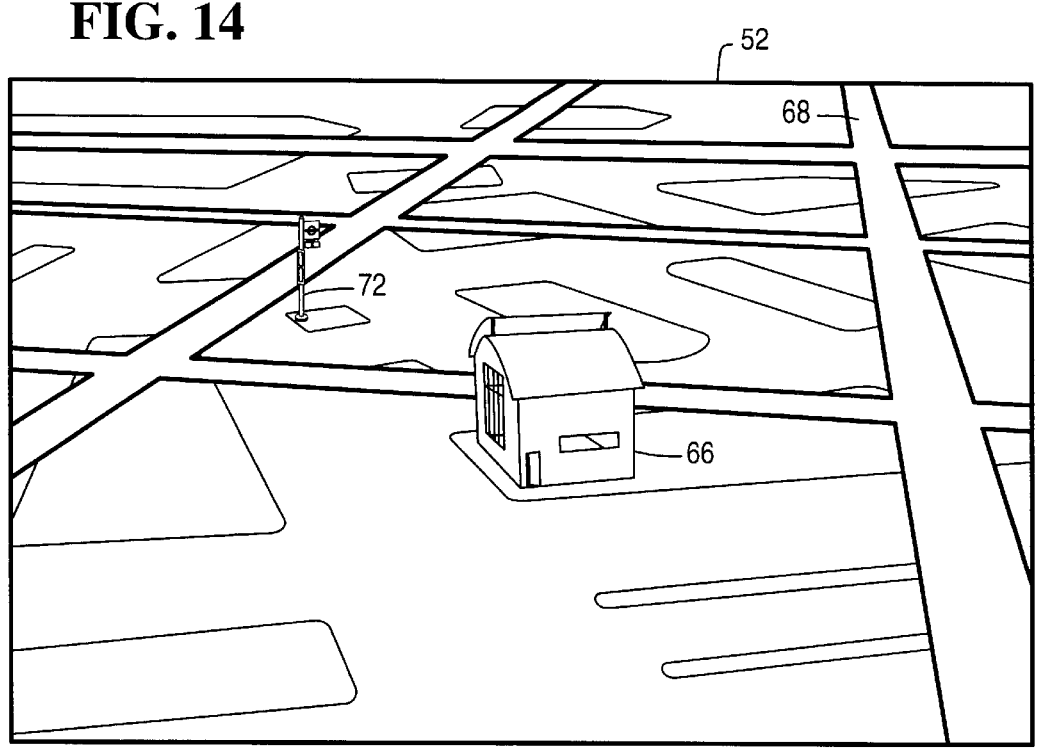
FIGS. 14 to 17 are views of the table of FIG. 3 in use in a bus-user scenario.

FIGS. 14 to 17 relate to the storyboard of FIG. 4 and the table 52 of FIG. 3, and show what happens on the display 24 when the user brings a tagged bus token or ticket to the table 52 so that the table 52 reads the tag using one or other of its two excitation coils by placing the tagged item onto the elliptical marker 58 or, more preferably, by dropping it into the slot 60. If the tag is read when the 'home' map 64A is selected and enabled for a particular user, the table 52 infers that the user seeks information about bus services near home. Then, as shown in FIG. 14, the perspective view of the local street map and the user's virtual house 66 zooms out and a bus stop icon 72 appears on the map at a location corresponding to the actual location of the nearest bus stop to the user's home.

Figure 15:
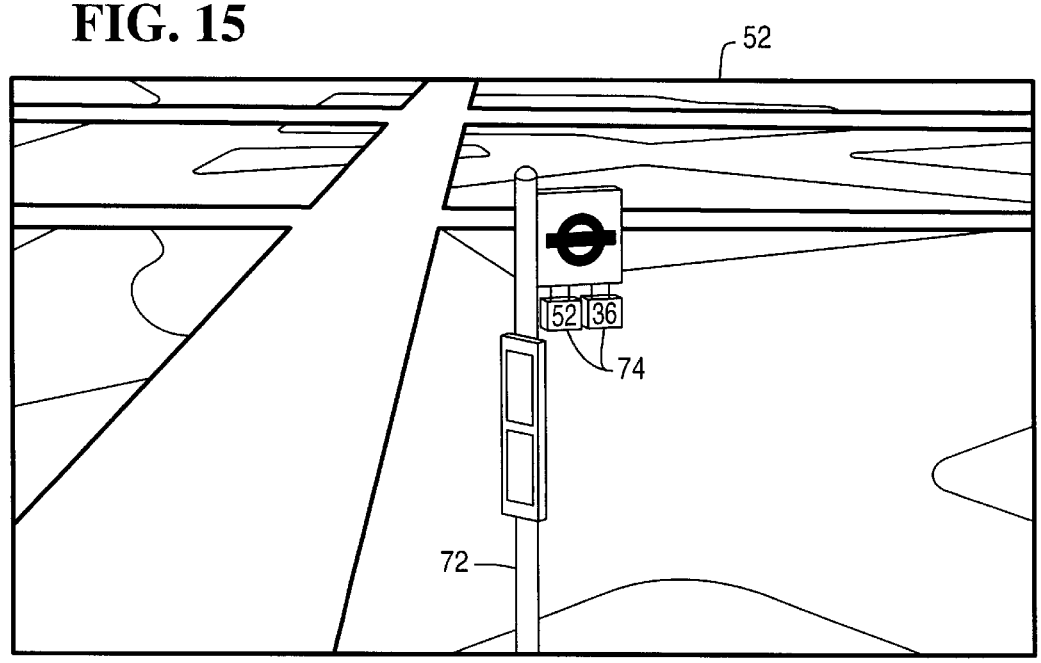
Figure 16:
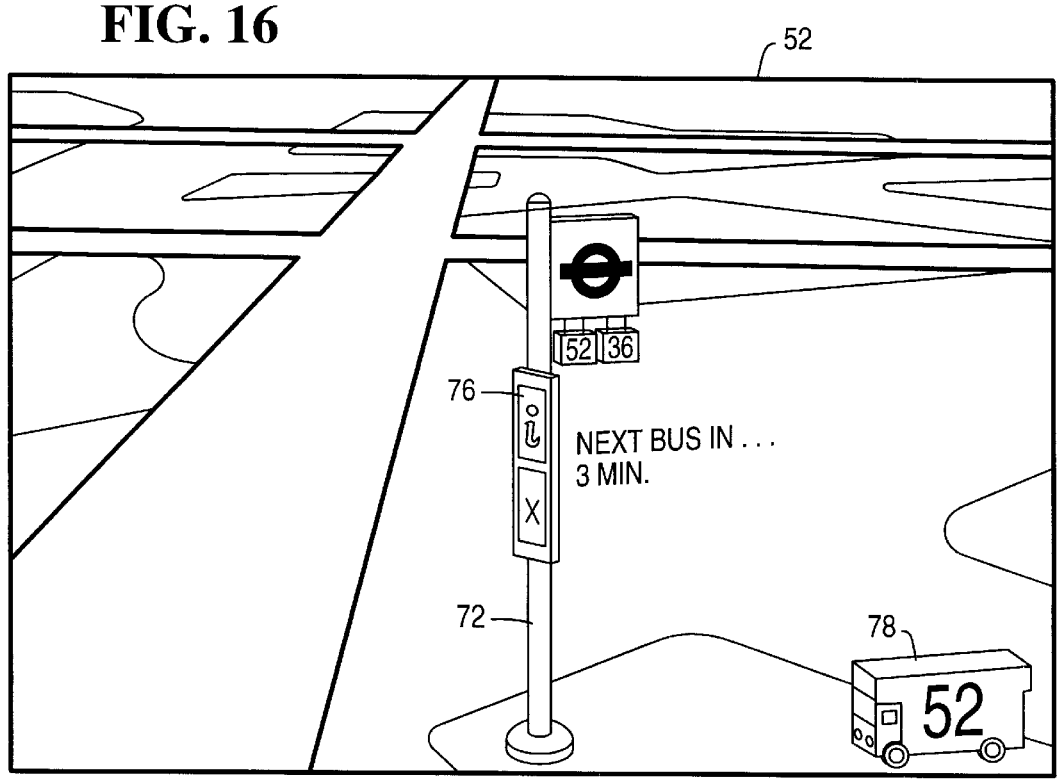

The user can zoom in on the bus stop icon 72 by touching the appropriate part of the touch screen overlay to obtain the enlarged view shown in FIG. 15. It will be noted that the enlarged bus stop icon 72 then displays the route numbers 74 of bus services that serve the corresponding physical bus stop and/or have a history of use by the user. If, say, the user wants to obtain information on a particular bus route, that information can be obtained by touching the appropriate route number 74 on the bus stop icon 72, whereupon the initial information 'next bus in 3 minutes' appears next to the bus stop icon 72 as shown in FIG. 16. FIG. 16 also shows how more general or detailed information can be obtained by interacting with the bus stop icon 72, for example by touching the virtual information board 76 on the bus stop icon, which action accesses the bus company's web site.

Figure 17:
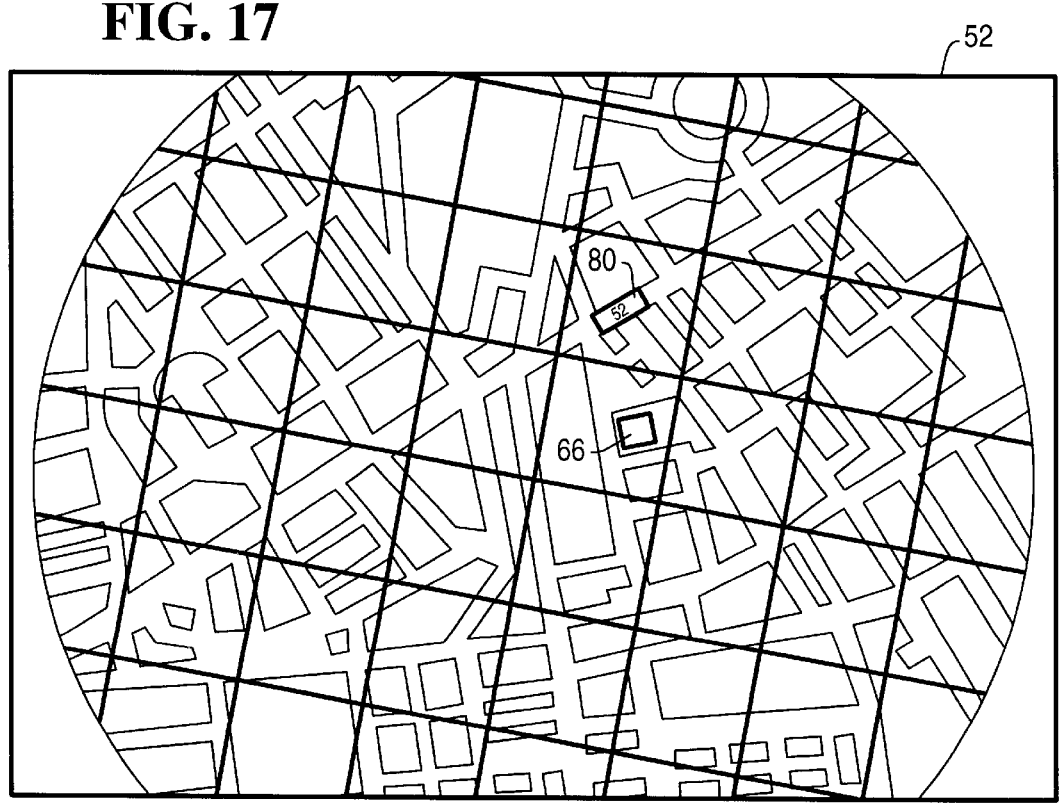

If the user so desires, the numbered bus icon 78 in the bottom corner of the display of FIG. 16 can be touched to call up the map shown in FIG. 17, which presents in plan or aerial view the aforementioned live, real-time street map showing the positions of a bus 80 on the selected route, in relation to the user's home. This information can be derived from the GPS facility or roadside transponder network by which the bus company knows the location of the working buses in its fleet. Accordingly, when the desired bus 80 approaches the user's home, the user can set off in time to meet the bus at the appropriate physical bus stop.

Figure 5:
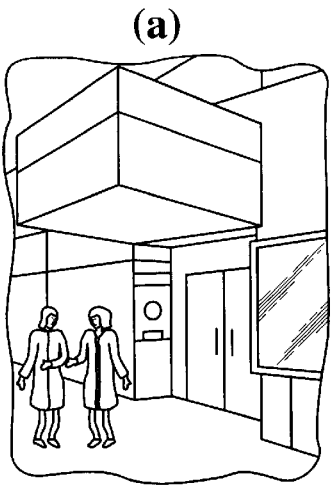
FIGS. 5(a) to 5(e) constitute a story board that illustrates a cinema trip scenario employing the invention.
Figure 5:
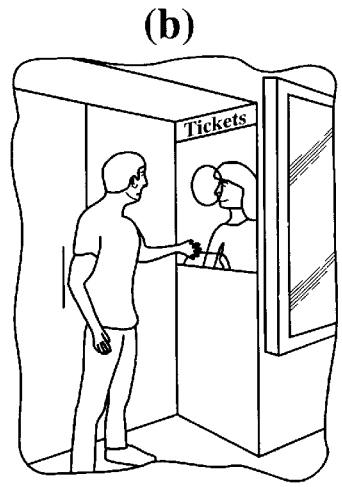
Figure 5:
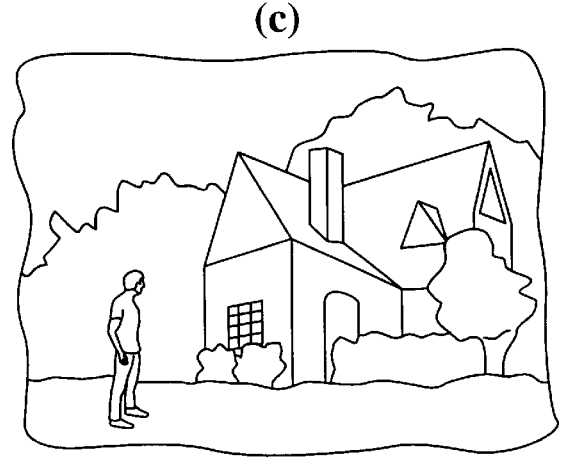
Figure 5:
Figure 5:
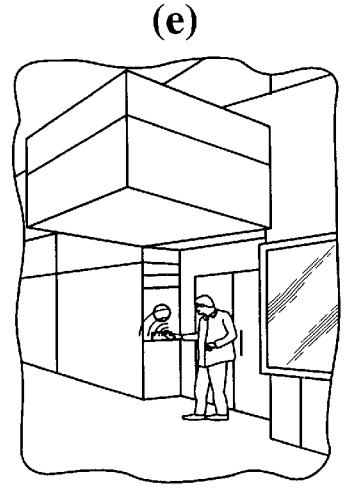
Figure 18:
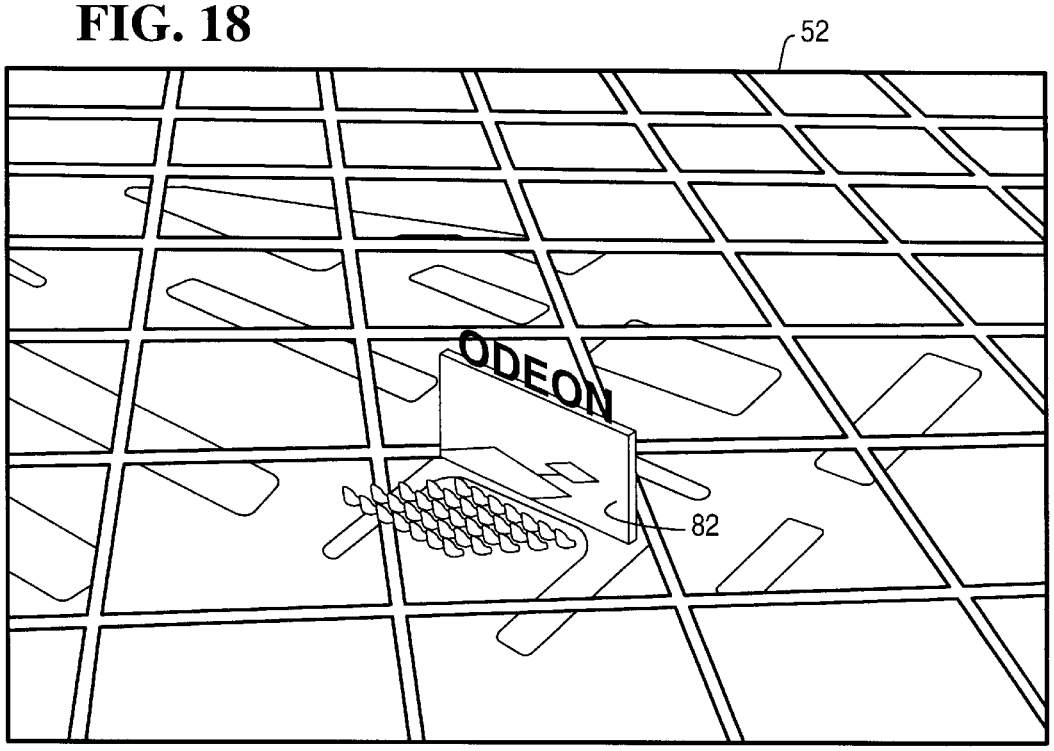
FIGS. 18 to 20 are views of the table of FIG. 3 in use in a cinema-goer scenario.
Figure 19:
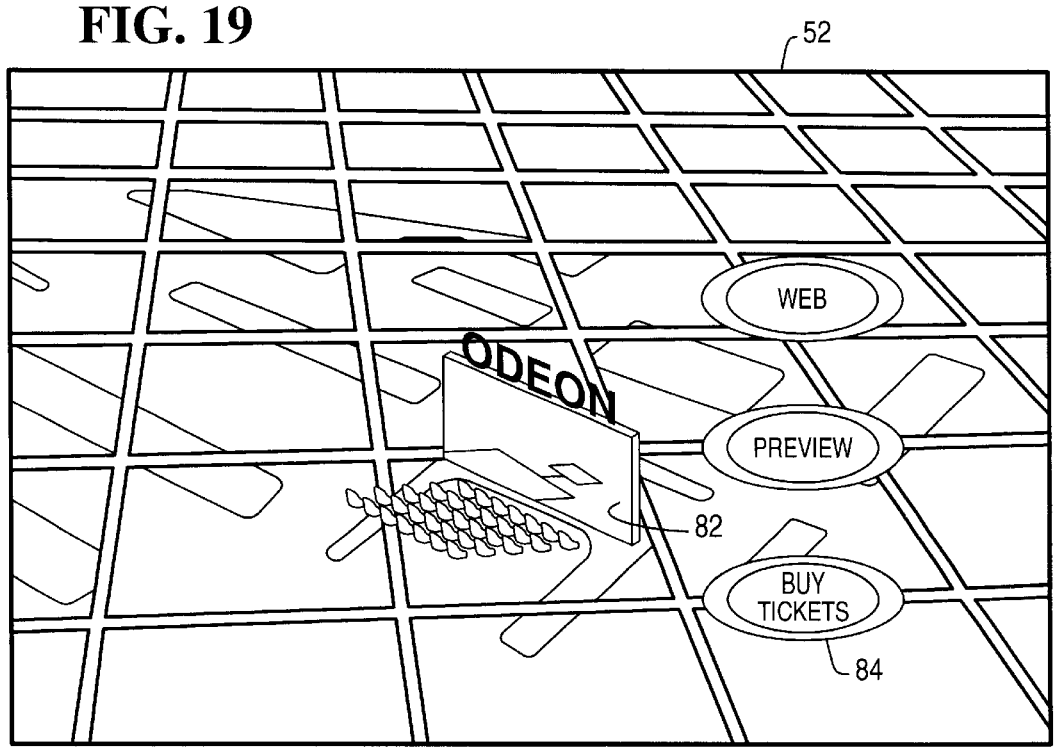
Figure 20:
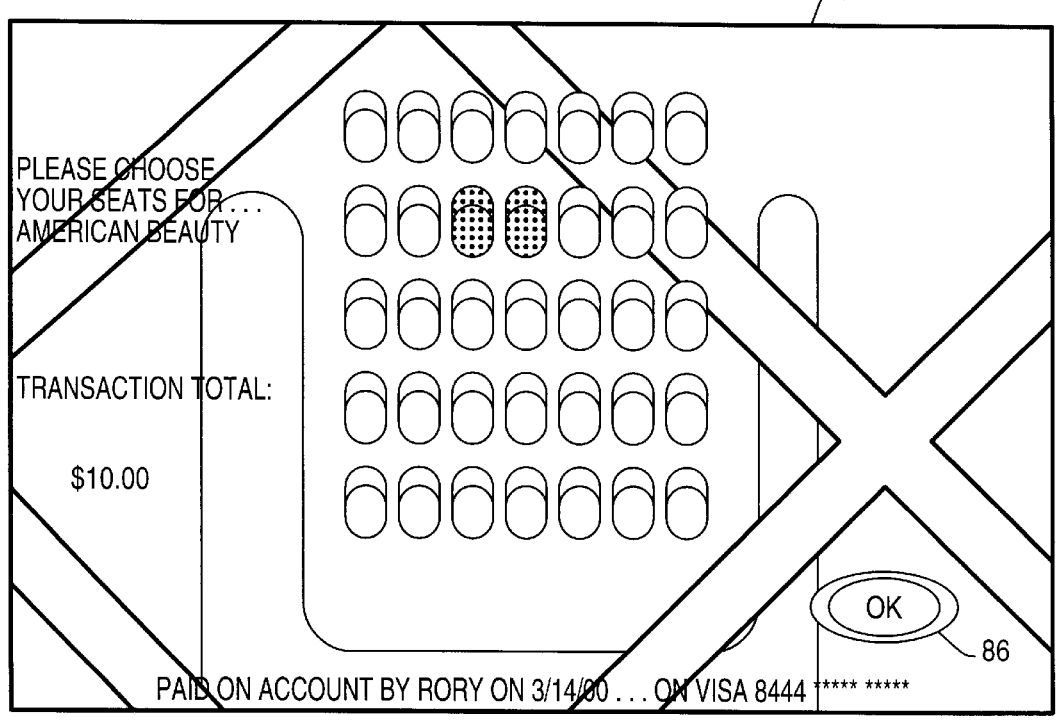

Referring now to FIGS. 18 to 20, these illustrations relate to the storyboard of FIG. 5 and the table 52 of FIG. 3, and show what happens on the display 24 when the table 52 reads a tagged cinema ticket and the 'town' map 64C is selected and enabled for a particular user. The table 52 then infers that the user seeks information about cinema showings in town, which in the example is outside the user's home environs but is the place where the user spends most of his or her leisure time when away from home.

In FIG. 18, a cinema icon 82 appears on the detailed town map at a location corresponding to the location of the physical cinema. The cinema icon has a virtual screen that identifies a current presentation at that cinema, in this example 'American Beauty'. Pressing the cinema icon 82 calls up the menu in FIG. 19, enabling the user to select the official web site for 'American Beauty', to view a preview, or to buy tickets. If the 'buy tickets' button 84 is pressed, a seating plan of the cinema appears as in FIG. 20, giving the user the opportunity to reserve seats at a desired location in the cinema by touching the desired available seats, to see how much that transaction will cost, and to confirm by pressing an OK button 86. The transaction is then charged to a predetermined account held by the user, as identified by the previously-configured table 52 and/or by the information network to which the table 52 is connected.

Figure 6:
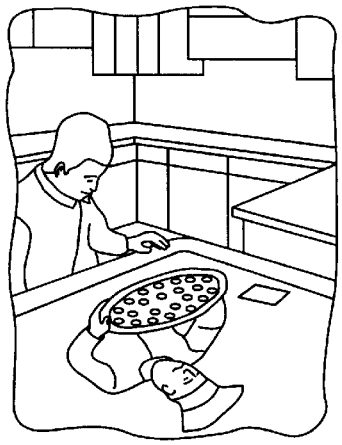
FIGS. 6(a) to 6(e) constitute a story board that illustrates a cooking/shopping scenario employing the invention.
Figure 6:
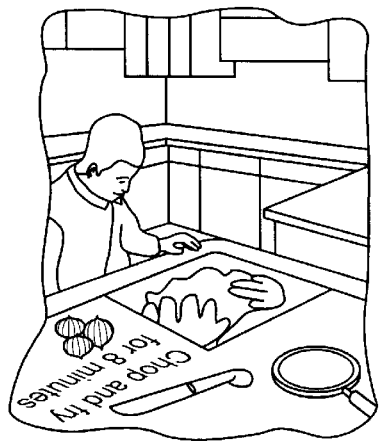
Figure 6:
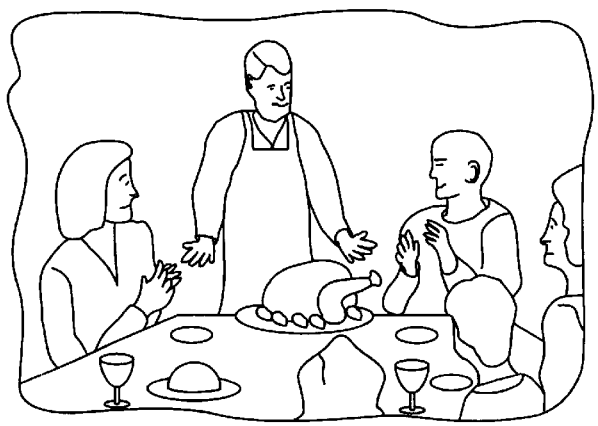
Figure 6:
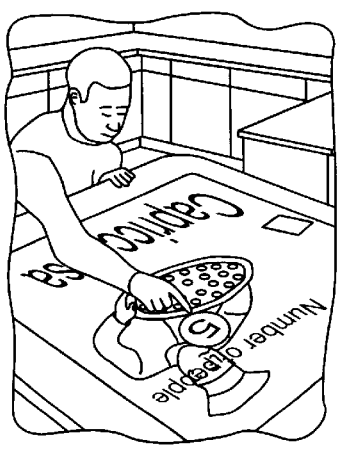
Figure 6:
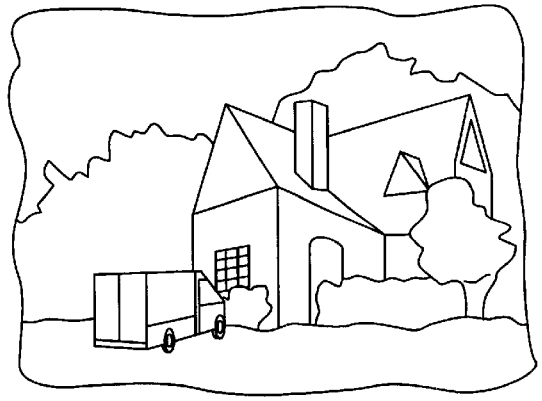
Figure 21:
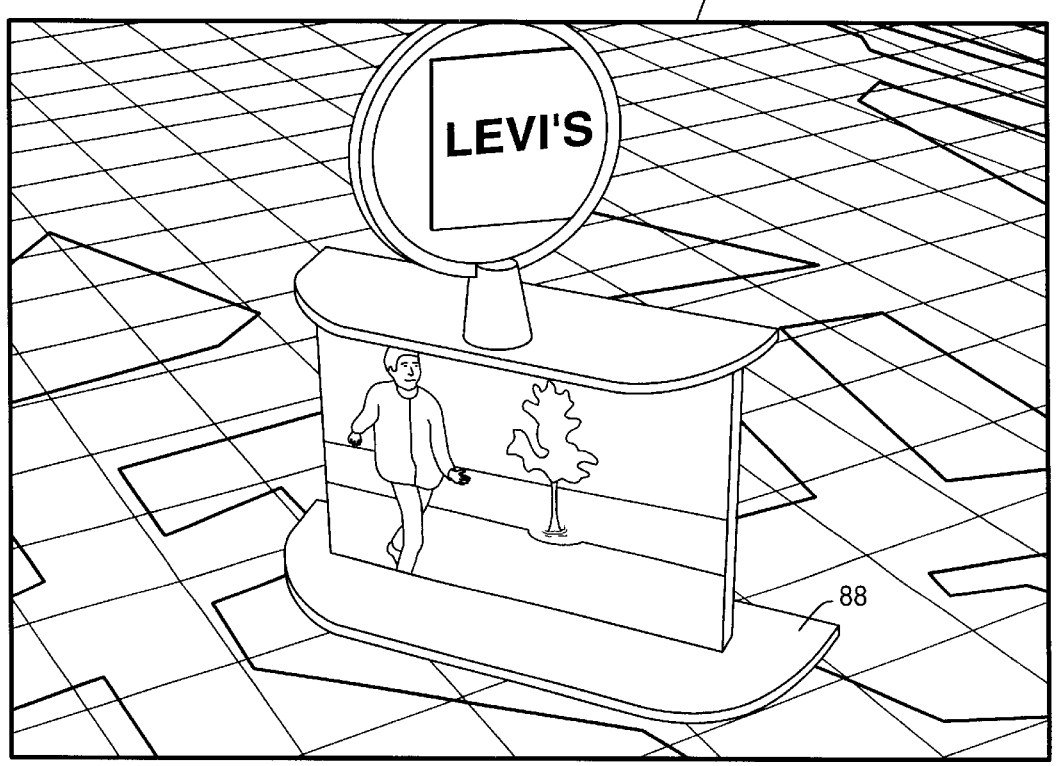
FIGS. 21 and 22 are views of the table of FIG. 3 in use in a shopping scenario.
Figure 22:
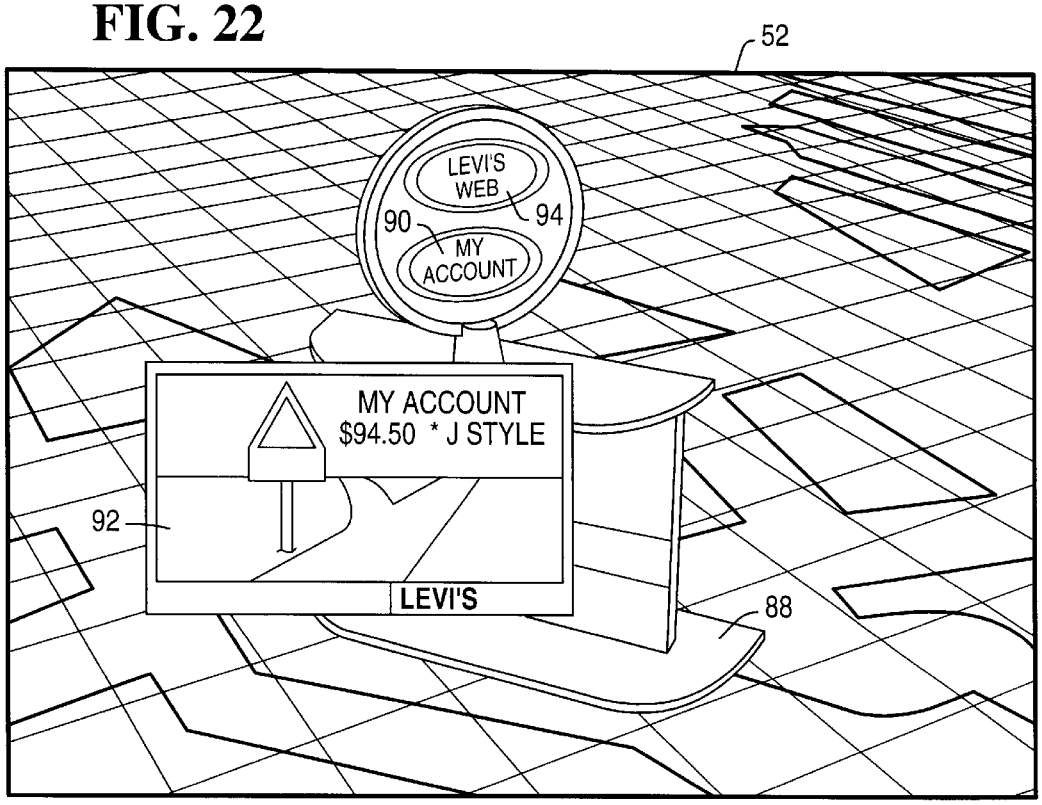

The shopping scenario of FIGS. 21 and 22 is akin to the storyboard of FIG. 6 but contemplates that the user wants to buy some Levi's casual clothes in response to a mailshot. So, the user has caused the table 52 to read a tagged mailshot item from the chosen retailer, while the table 52 displays an appropriate 'town' map 64C or 'home' map 64A depending upon where the user wants to go shopping. This causes a Levi's shop icon 88 to appear on the map 64 at the appropriate location as shown in FIG. 21, which icon 88 can be pressed to bring up a menu as shown in FIG. 22.

Figure 23:
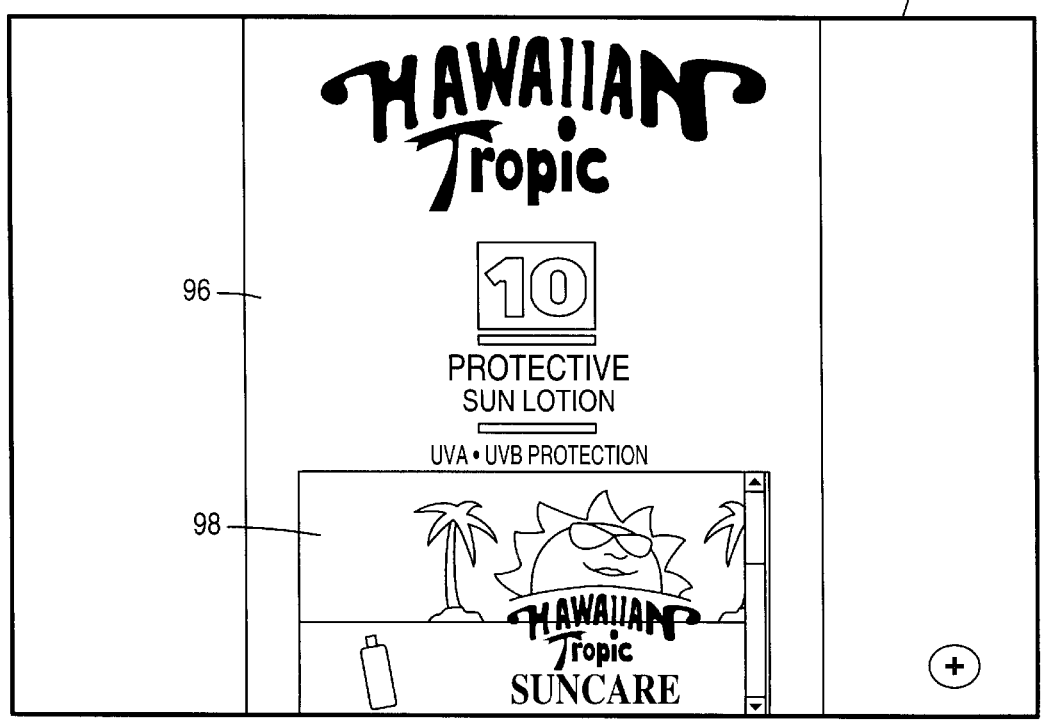
FIG. 23 is a view of the table of FIG. 3 displaying an interface that represents a tagged item placed upon the table.

The menu in FIG. 22 includes a 'my account' button 90 enabling the user to check the standing of his or her account held with the retailer, whereupon a window 92 opens to give the account position. All being well with the account, the user can visit the physical shop to try on the proposed purchases or, of course, the user could simply access the retailer's web site and order clothes for home delivery if desired, in which case the user can simply press the 'Levi's web' button 94 on the menu of FIG. 22. Referring finally to FIG. 23 of the drawings, this shows the display of table 52 in a situation where a purchased item has been placed on the table 52 over the elliptical marker 58. When a tag on the purchased item is read by the table 52, the table 52 downloads and displays a representation of the purchased item that acts as an interface or as a menu for further information related to that item.

In the example shown in FIG. 23, the purchased item is a bottle of Hawaiian Tropic sun lotion. The act of placing that item onto the table has downloaded and displayed an image 96 of the bottle, superimposed by a window 98 that displays the Hawaiian Tropic web site. However, the bottle image 96 itself is a graphical user interface in which key words, phrases and icons on the bottle are links to related web sites. For example, the word 'Tropic' can be a link to the web site of a travel agency specializing in exotic holidays, and the word 'protective' can be a link to web sites about the prevention of skin cancer. This principle extends to any graphical or textual matter on the image 96: even individual ingredients in a list of ingredients could be links to respective related web sites.

It will be apparent that by means of the invention, the purchased item takes on a usefulness beyond its face value: the facility for reading a tag on the item and for accessing a related information resource means that the item becomes the key to a wealth of useful information. The item therefore becomes part of the user's life for more than one reason, all the while raising the user's awareness of the brands that it carries. This multiplies the effect of the advertising message and integrates the advertiser's virtual identity with its real-world marketing strategy, linking together its physical and virtual presence. Otherwise, this integration can prove difficult because until the invention, web sites were enjoyed in a radically different context from the company's physical presence in terms of stores, products, service outlets and personnel.

The concept of a tagged purchased item can be regarded more broadly as a marketing tool that allows a company to pass on to a consumer a tagged object that is a physical symbol and a mnemonic of the company, and that allows the consumer to connect to a web site nominated by the company. That web site can link to many other web sites by means of the interface techniques described above.

The physical form of the object can be, for example, a plastics molding that takes the form of a mascot or other symbol of the company, and could be particularly effective for marketing to children in view of their affinity for collectible toys. It will also be apparent that although use with a table-like tag reading apparatus is preferred, this aspect of the invention does not require tag reading apparatus to be of any particular form. Nor does the tag have to be a BiStatix device or a bar code: other non-volatile memory devices such as an iButton (trade mark) produced by Dallas Semiconductors, Inc. can be used instead, being readable by a receiver connected to the serial port of a PC. It is also possible for cookies to be stored on the tag rather than on the user's PC.

More generally, the storyboards and the detailed examples above outline day-to-day experiences of an ordinary life, and illustrate how subtly and yet profoundly the invention can affect such a life. The technology gradually becomes invisible to the user but its effect continues to grow. With time, the user collects many different types of tags that are relevant to his or her lifestyle and personality. The intelligent system responds accordingly, tailoring itself to reflect the information that is relevant to the user's life. This process happens without conscious tailoring input from the user, who by simply using the invention and enjoying its benefits, invests the necessary input without realizing it.

Many variations are possible without departing from the inventive concepts. For example, the invention lends itself to marketing by mailing tagged letters or brochures to potential buyers of a product or service, who can then learn more about the proposed purchase simply by bringing the tagged item into range of a table-mounted tag reader and viewing the resulting display. Optional interaction with the display can be employed to effect the purchase if desired. Accordingly, reference should be made to the accompanying claims rather than the foregoing specific description in interpreting the scope of the invention.

What is claimed is:

1. An interface method for use in accessing a displayable information resource, the method comprising:

displaying to a user a map showing the environs of a physical base location that the user lives in, works in or visits frequently during day-to-day life;

placing on that map interactive virtual objects representing facilities with which the user can interact when in and around that base location;

the virtual objects represent facilities with which the user has a history of interaction;

the selection of virtual objects is tailored by the user's history of interaction with the facilities represented by those virtual objects;

the user tailors the selection of virtual objects by gathering items that relate to the facilities with which the user has interacted, each item having a machine-readable tag that contains information relating to the respective facility, or an address of a resource for such information;

creating a virtual object on first reading a tagged item that relates to a facility; and storing the created virtual object and displaying the stored virtual object on reading another tagged item that relates to the same facility.

2. A method according to claim 1, wherein the virtual objects are located on the map at positions corresponding to facilities in and around the base location represented by the map.

3. A method according to claim 1, further comprising displaying on the map a first virtual object representing the user's home, workplace or other base location.

4. A method according to claim 3, further comprising simultaneously displaying on the map a second virtual object representing a facility with which the user can interact and showing the relative position of that facility with respect to the base location.

5. A method according to claim 4, wherein the display of the map zooms out from the first virtual object to encompass the second virtual object in the same display.

6. A method according to claim 1, further comprising interacting with the displayed virtual object by touching or clicking on a part of the object.

7. A method according to claim 6, further comprising controlling the interaction by touching or clicking on different parts of the displayed virtual object.

8. A method according to claim 7, further comprising zooming in on a selected displayed virtual object to enable interaction by touching or clicking on different parts of the displayed virtual object.

9. A method according to claim 1, further comprising superimposing a window or menu on the map display.

10. A method according to claim 1, wherein the virtual objects are superimposed on a virtual streetscape.

\* \* \* \* \*